US007809506B2

(12) United States Patent
Kuge et al.

(10) Patent No.: US 7,809,506 B2
(45) Date of Patent: Oct. 5, 2010

(54) DRIVING INTENTION ESTIMATION SYSTEM, DRIVER ASSISTING SYSTEM, AND VEHICLE WITH THE SYSTEM

(75) Inventors: Nobuyuki Kuge, Zushi (JP); Takeshi Kimura, Yokohama (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 1351 days.

(21) Appl. No.: 11/285,778

(22) Filed: Nov. 23, 2005

(65) Prior Publication Data

US 2006/0145827 A1 Jul. 6, 2006

(30) Foreign Application Priority Data

Nov. 26, 2004 (JP) ........................... P2004-341717

(51) Int. Cl.
*G06F 17/10* (2006.01)
*G06G 7/78* (2006.01)
*G06G 1/16* (2006.01)
*G06F 19/00* (2006.01)
*G06G 7/70* (2006.01)
*G06G 7/76* (2006.01)
*G06G 7/48* (2006.01)
*G08G 1/00* (2006.01)

(52) U.S. Cl. ...................................................... 701/301

(58) Field of Classification Search ....................... None
See application file for complete search history.

(56) References Cited

U.S. PATENT DOCUMENTS 5,485,892 A * 1/1996 Fujita ......................... 180/167
6,092,619 A * 7/2000 Nishikawa et al. .......... 180/446
6,134,491 A * 10/2000 Kawagoe et al. .............. 701/43
6,226,581 B1 * 5/2001 Reimann et al. .............. 701/48

(Continued)

FOREIGN PATENT DOCUMENTS

EP 1 065 520 A2 1/2001

(Continued)

OTHER PUBLICATIONS

U.S. Appl. No. 11/142,479, filed Jun. 2, 2005.

*Primary Examiner*—Khoi Tran
*Assistant Examiner*—Nicholas Kiswanto
(74) *Attorney, Agent, or Firm*—McDermott Will & Emery LLP

(57) ABSTRACT

A driving intention estimation, driver assistance and vehicle with the driver assistance for providing a stable estimation of a driver's driving intention even if detection of a relationship between an own vehicle and lane markers is lost. A plurality of imaginary drivers of a first type and a second type, each being given a respective driving intention, are provided. When detection of lane markers is reliably kept, a driving intention by a real driver is estimated based on a comparison between an operation of the real driver to operations of the imaginary drivers of the first type that are calculated based on the relative positional relationship of the own vehicle to the detected lane marker. When the detection of lane markers is lost, operations of the plurality of imaginary drivers are calculated based on the relative positional relationship of the own vehicle to a preceding vehicle. In response to the status of detection of the lane marker, either the imaginary drivers of the first type or the second type are selected.

16 Claims, 18 Drawing Sheets

U.S. PATENT DOCUMENTS 6,256,561 B1 * 7/2001 Asanuma .................... 701/41
6,574,560 B2 * 6/2003 Abe et al. .................. 701/301
6,889,161 B2 * 5/2005 Winner et al. ............... 702/147
7,222,507 B2 * 5/2007 Wetzel et al. .................. 70/48
7,349,767 B2 * 3/2008 Kuge et al. .................... 701/1
7,392,120 B2 * 6/2008 Matsumoto et al. ........... 701/41
2003/0038714 A1 2/2003 Matsumoto et al.
2003/0195684 A1 * 10/2003 Martens ....................... 701/41
2004/0164851 A1 8/2004 Crawshaw
2005/0065663 A1 * 3/2005 Oyama .......................... 701/1
2005/0107938 A1 * 5/2005 Wetzel et al. ................. 701/70
2005/0131590 A1 6/2005 Kuge et al.
2009/0091435 A1 * 4/2009 Bolourchi .................. 340/435

FOREIGN PATENT DOCUMENTS

EP 1 087 360 A2 3/2001
EP 1 346 892 A2 9/2003
EP 1 375 280 A2 1/2004
EP 1 413 500 A1 4/2004
EP 1 422 111 A2 5/2004
JP 2002-331850 11/2002

* cited by examiner 1
30
REAL DRIVER'S OPERATION DETECTOR
10
VEHICLE'S SURROUNDING DETECTOR
20
VEHICLE'S STATUS DETECTOR
60
SELECTOR
40
FIRST IMAGINARY DRIVER'S OPERATION CALCULATOR
50
SECOND IMAGINARY DRIVER'S OPERATION CALCULATOR
70
LIKELIHOOD Pid CALCULATOR
80
DRIVER'S DRIVING INTENTION ESTIMATOR
λrd
OUTPUT ESTIMATED DRIVING INTENTION

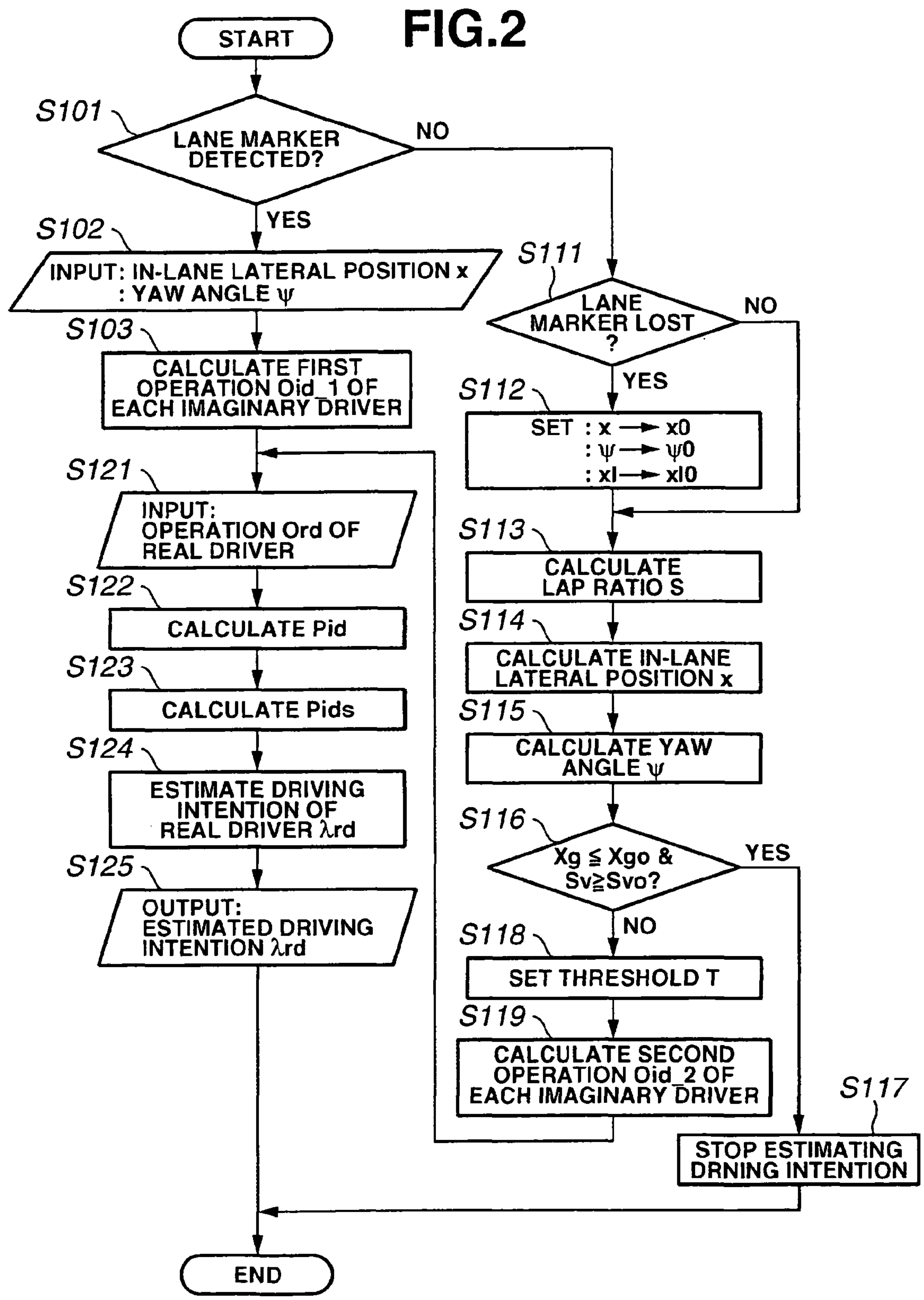
FIG.2
START
S101
LANE MARKER DETECTED?
NO
YES
S102
INPUT: IN-LANE LATERAL POSITION x
: YAW ANGLE ψ
S103
CALCULATE FIRST OPERATION Oid_1 OF EACH IMAGINARY DRIVER
S121
INPUT: OPERATION Ord OF REAL DRIVER
S122
CALCULATE Pid
S123
CALCULATE Pids
S124
ESTIMATE DRIVING INTENTION OF REAL DRIVER λrd
S125
OUTPUT: ESTIMATED DRIVING INTENTION λrd
S111
LANE MARKER LOST ?
NO
YES
S112
SET : x → x0
: ψ → ψ0
: xl → xl0
S113
CALCULATE LAP RATIO S
S114
CALCULATE IN-LANE LATERAL POSITION x
S115
CALCULATE YAW ANGLE ψ
S116
Xg ≦ Xgo & Sv≧Svo?
YES
NO
S118
SET THRESHOLD T
S119
CALCULATE SECOND OPERATION Oid_2 OF EACH IMAGINARY DRIVER
S117
STOP ESTIMATING DRNING INTENTION
END

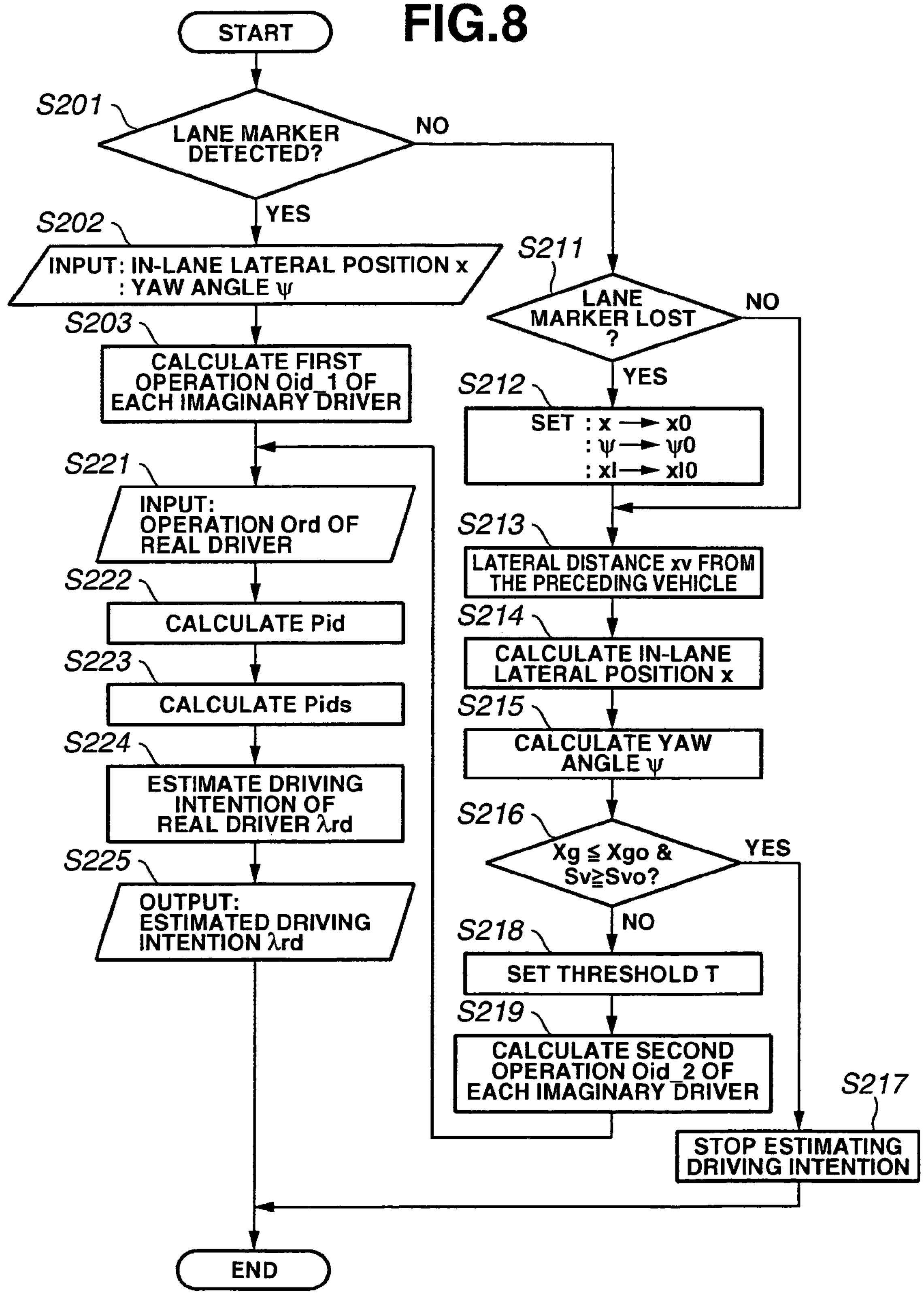
FIG.8
START
S201
LANE MARKER DETECTED?
NO
YES
S202
INPUT: IN-LANE LATERAL POSITION x
: YAW ANGLE ψ
S203
CALCULATE FIRST OPERATION Oid_1 OF EACH IMAGINARY DRIVER
S221
INPUT: OPERATION Ord OF REAL DRIVER
S222
CALCULATE Pid
S223
CALCULATE Pids
S224
ESTIMATE DRIVING INTENTION OF REAL DRIVER λrd
S225
OUTPUT: ESTIMATED DRIVING INTENTION λrd
S211
LANE MARKER LOST ?
NO
YES
S212
SET : x → x0
: ψ → ψ0
: xl → xl0
S213
LATERAL DISTANCE xv FROM THE PRECEDING VEHICLE
S214
CALCULATE IN-LANE LATERAL POSITION x
S215
CALCULATE YAW ANGLE ψ
S216
Xg ≦ Xgo & Sv≧Svo?
YES
NO
S218
SET THRESHOLD T
S219
CALCULATE SECOND OPERATION Oid_2 OF EACH IMAGINARY DRIVER
S217
STOP ESTIMATING DRIVING INTENTION
END

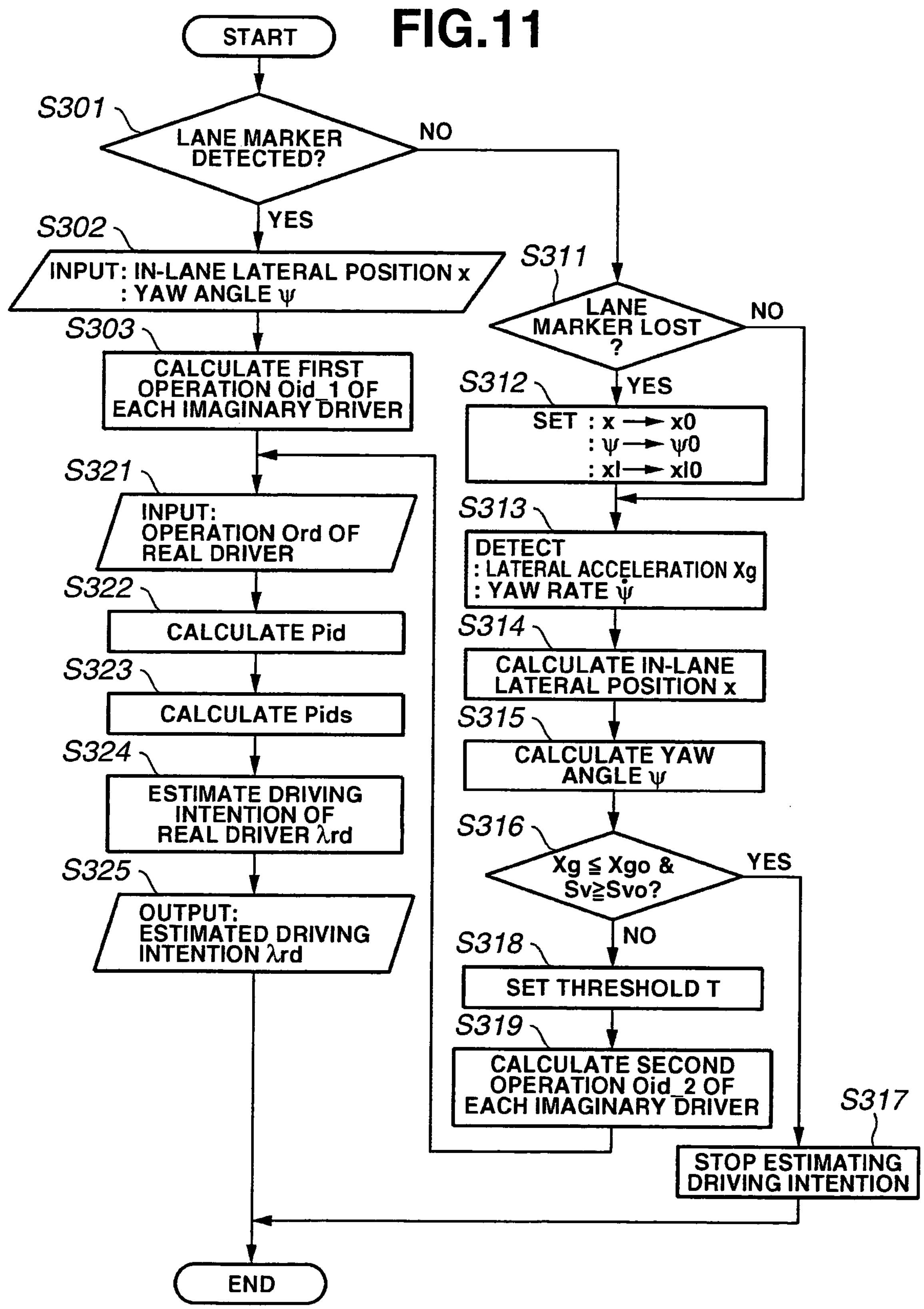
FIG.11
START
S301
LANE MARKER DETECTED?
NO
YES
S302
INPUT: IN-LANE LATERAL POSITION x
: YAW ANGLE ψ
S303
CALCULATE FIRST OPERATION Oid_1 OF EACH IMAGINARY DRIVER
S321
INPUT: OPERATION Ord OF REAL DRIVER
S322
CALCULATE Pid
S323
CALCULATE Pids
S324
ESTIMATE DRIVING INTENTION OF REAL DRIVER λrd
S325
OUTPUT: ESTIMATED DRIVING INTENTION λrd
S311
LANE MARKER LOST ?
NO
YES
S312
SET : x → x0
: ψ → ψ0
: xl → xl0
S313
DETECT
: LATERAL ACCELERATION Xg
: YAW RATE ψ̇
S314
CALCULATE IN-LANE LATERAL POSITION x
S315
CALCULATE YAW ANGLE ψ
S316
Xg ≦ Xgo & Sv≧Svo?
YES
NO
S318
SET THRESHOLD T
S319
CALCULATE SECOND OPERATION Oid_2 OF EACH IMAGINARY DRIVER
S317
STOP ESTIMATING DRIVING INTENTION
END 100
1
DRIVER'S INTENTION ESTIMATING SYSTEM
110
LASER RADAR
140
VEHICLE SPEED SENSOR
120
FRONT CAMERA
130
IMAGE PROCESSOR
181
ACC. PEDAL STROKE SENSOR
λrd
AS
150 CONTROLLER
151
RP CALCULATOR
RP
152
ACC. PEDAL REACTION FORCE INSTRUCTION VALUE FA CALCULATOR
FA
153
INSTRUCTION VALUE FA CORRECTING SECTION
FAcc
170
ACC. PEDAL REACTION FORCE CONTROL UNIT
180
SERVO MOTOR

DRIVING INTENTION ESTIMATION SYSTEM, DRIVER ASSISTING SYSTEM, AND VEHICLE WITH THE SYSTEM

RELATED APPLICATION

This application claims the benefit of priority from Japanese patent application No. 2004-341717, filed Nov. 26, 2004, the disclosure of which is incorporated herein by reference in its entirety.

FIELD OF THE DISCLOSURE

This application generally relates to a driving intention estimating system and its application, and more specifically, to a driving intention estimating system that provides a stable estimation of a driver's driving intention even when detection of a relationship between an own vehicle and lane markers is lost.

BACKGROUND OF THE DISCLOSURE

JP2002-331850A describes a driving intention estimator, by which directions that the driver's eyes turn to are projected onto a plane divided into a number of regions, for calculating a distribution of projected eye directions over the divided regions to estimate the driver's driving intention.

Estimating driver's driving intention using eye directions and the frequency distribution thereof are satisfactory to only certain extents. However, the estimation accuracy may vary with different running environments and different drivers because the driver's eye movements associated with the same driving intention may vary with different running environments, and the drivers may show different eye movements associated with the same driving intention.

One approach without relying on the driver's eye movements collects information related to lane markers to estimate a driving intention of the driver. This approach, however, does not address a situation where accurate information regarding the lane marks is lost or unreliable due to variations of the running environment.

Therefore, there is a need remains for a reliable and uninterrupted estimation of driving intention even when a vehicle operates in a constantly changing environment. There is another need to effectively estimate a driving intention even when effective detections or tracking or lane markers cannot be maintained.

SUMMARY OF THE DISCLOSURE

This disclosure describes embodiments of driving intention estimations and their applications for providing a stable estimation of a driver's driving intention even when detection of a relationship between an own vehicle and lane markers is lost.

An exemplary system for estimating a driving intention comprising a detector configured to obtain a first type of environmental information and a second type of environmental information relating to a driving environment associated with an own vehicle. The first type of environmental information is different from the second type of environmental information. An operation detector configured to detect an operation of a real driver of the own vehicle. A first imaginary driver's operation calculator is provided to calculate a respective imaginary operation of each of a plurality of imaginary drivers of a first type based on the first type of environmental information. The respective imaginary operation of each of the imaginary drivers of the first type is needed to accomplish a respective imaginary driving intention assigned to each of the imaginary drivers of the first type. A second imaginary driver's operation calculator is used to calculate a respective imaginary operation of each of a plurality of imaginary drivers of a second type based on the second type of environmental information. The respective imaginary operation of each of the imaginary drivers of the second type is needed to accomplish a respective imaginary driving intention assigned to each of the imaginary drivers of the second type. A selector selects the imaginary drivers of the first type or the imaginary drivers of the second type. A driving intention estimator estimates a driving intention of the real driver based on the detected operation of the real driver and the respective imaginary operation of each of the imaginary drivers of the selected type.

In one aspect, the driving intention estimator estimates the driving intention of the real driver based on a predetermined criterion using a threshold. The threshold corresponding to the selected imaginary drivers being the second type is set to be higher relative to the threshold corresponding to the selected imaginary drivers being the first type. The second imaginary driver's operation calculator may calculate the respective operation of each of the imaginary drivers of the second type based on an overlapping ratio of a lap between the own vehicle and a preceding vehicle, relative to a width of the preceding vehicle. Responsive to the imaginary drivers of the second type being selected, the threshold is decreased responding to a decreased overlapping ratio.

According to one embodiment, the second imaginary driver's operation calculator may calculate the respective operation of each of the imaginary drivers of the second type based on a relative lateral positional relationship of the own vehicle to a preceding vehicle. The relative lateral positional relationship may be an overlapping ratio representing a lap between the own vehicle and the preceding vehicle, relative to a width of the preceding vehicle. The system may further include a detector configured to detect lateral acceleration of the own vehicle. The driver's driving intention estimator stops estimating the driving intention of the real driver responsive to the lateral acceleration being no greater than a predetermined acceleration value and a time rate of the overlapping ratio being no less than a predetermined rate value. In another aspect, the relative lateral positional relationship is a lateral distance between a middle point between lateral ends of a front end of the own vehicle and a middle point between lateral ends of a rear end of the preceding vehicle.

According to another embodiment, a detector is provided to detect a behavior of the own vehicle. The second imaginary driver's operation calculator calculates the respective operation of each of the imaginary drivers of the second type based on the detected behavior immediately after a selection by the selector changes from the imaginary drivers of the first type to the imaginary drivers of the second type. The detected behavior of the own vehicle may be lateral acceleration.

According to still another embodiment, a driver assisting system for an own vehicle comprising a detector configured to obtain a first type of environmental information and a second type of environmental information relating to a driving environment associated with an own vehicle. The first type of environmental information is different from the second type of environmental information. An operation detector configured to detect an operation of a real driver of the own vehicle. A first imaginary driver's operation calculator is provided to calculate a respective imaginary operation of each of a plurality of imaginary drivers of a first type based on the first type of environmental information. The respective imaginary operation of each of the imaginary drivers of the first type is needed to accomplish a respective imaginary driving intention assigned to each of the imaginary drivers of the first type. A second imaginary driver's operation calculator is used to calculate a respective imaginary operation of each of a plurality of imaginary drivers of a second type based on the second type of environmental information. The respective imaginary operation of each of the imaginary drivers of the second type is needed to accomplish a respective imaginary driving intention assigned to each of the imaginary drivers of the second type. A selector selects the imaginary drivers of the first type or the imaginary drivers of the second type. A driving intention estimator estimates a driving intention of the real driver based on the detected operation of the real driver and the respective imaginary operation of each of the imaginary drivers of the selected type. An obstacle detector configured to detect an obstacle around the own vehicle, and a risk potential calculator is provided to calculate risk potential associated with the own vehicle based on a detection result of the obstacle detector. A reaction force calculator configured to calculate a reaction force applying to an accelerator pedal based on the risk potential and the estimated driving intention of the real driver.

According to one embodiment, the reaction force calculator corrects the risk potential calculated by the risk potential calculator based on the estimated driving intention, and generates the reaction force based on the corrected risk potential. In one aspect, the risk potential may be corrected in a way that the risk potential corresponding to the estimated driving intention being a driving intention to change lanes is lower than the risk potential corresponding to the estimated driving intention not being a driving intention to change lanes. The risk potential may be corrected in a way that the risk potential corresponding to the estimated driving intention to change lanes that is estimated based on the imaginary drivers of the second type is set to be smaller relative to the risk potential corresponding to the estimated driving intention to change lanes that is estimated based on the imaginary drivers of the first type.

According to another embodiment, the reaction force calculator calculates a value of the reaction force based on the risk potential, and corrects the calculated value of the reaction force based on the estimated driving intention of the real driver. The value of the reaction force may be corrected in a way that the value of the reaction force corresponding to the estimated driving intention being a driving intention to change lanes is set to be smaller than the value of the reaction force corresponding to the estimated driving intention not being a driving intention to change lanes. In one aspect, the value of the reaction force is corrected in a way that the value of the reaction force corresponding to the estimated driving intention to change lanes that is estimated based on the imaginary drivers of the second type is set to be lower relative to the value of the reaction force corresponding to the estimated driving intention to change lanes that is estimated based on the imaginary drivers of the first type.

An exemplary method for estimating a driving intention obtains a first type of environmental information and a second type of environmental information relating to a driving environment associated with an own vehicle. The first type of environmental information is different from the second type of environmental information. An operation of a real driver of the own vehicle is detected. A respective imaginary operation of each of a plurality of imaginary drivers of a first type is calculated based on the first type of environmental information. The respective imaginary operation of each of the imaginary drivers of the first type is needed to accomplish a respective imaginary driving intention assigned to each of the imaginary drivers of the first type. A respective imaginary operation of each of a plurality of imaginary drivers of a second type is calculated based on the second type of environmental information. The respective imaginary operation of each of the imaginary drivers of the second type is needed to accomplish a respective imaginary driving intention assigned to each of the imaginary drivers of the second type. Either the imaginary drivers of the first type or the imaginary drivers of the second type are selected. A driving intention of the real driver is estimated based on the detected operation of the real driver and the respective imaginary operation of each of the plurality of imaginary drivers of the selected type.

The exemplary intention estimation method may be used in assisting a driver in driving the own vehicle. An obstacle around the own vehicle is detected. Risk potential associated with the own vehicle is calculated based on a result of the step of detecting the obstacle. A reaction force applied to an accelerator pedal is calculated based on the risk potential and the estimated driving intention.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

FIG. 2 is a flow chart illustrating the operation of the embodiment shown in FIG. 1.

FIG. 8 is a flow chart illustrating the operation of a second exemplary embodiment for estimating a driving intention according to the present disclosure.

FIG. 11 is a flow chart illustrating the operation of a third exemplary embodiment for estimating driving intention.

DETAILED DESCRIPTION OF THE PREFERRED DISCLOSURE

Various exemplary embodiments according to the present disclosure are described hereunder in detail with suitable references to the accompanying drawings.

First Exemplary Embodiment

Figure 1:
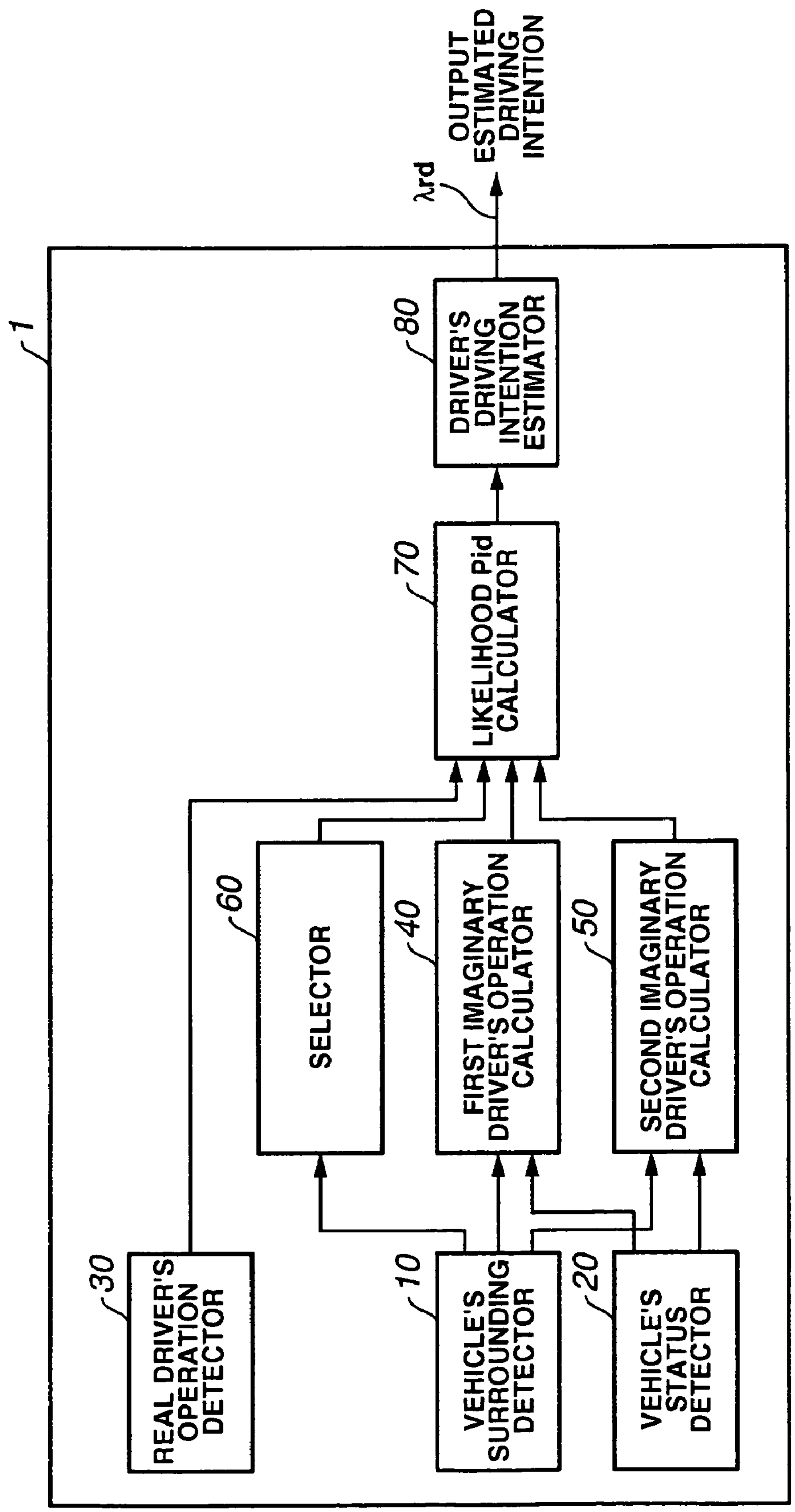
FIG. 1 is a block diagram illustrating a first exemplary embodiment for estimating a driving intention according to the present disclosure.

FIG. 1 is a block diagram illustrating an exemplary driving intention estimating system 1 according to the present disclosure. The driving intention estimating system 1 is provided with a vehicle's surrounding detector 10 configured to detect vehicle's surround of an own vehicle; a vehicle's status detector 20 configured to detect the vehicle's status; a real driver's operation detector 30 configured to detect an operation of a real driver of the own vehicle; a first imaginary driver's operation calculator 40; a second imaginary driver's operation calculator 50; a selector 60; a likelihood calculator 70; and a driver's driving intention estimator 80.

The system 1 has access to reference data, such as data related to a plurality of imaginary drivers. Same or different numbers or types of imaginary drivers may be used depending on the purpose of application or availability of data. Each of the plurality of imaginary drivers has or is given a driving intention, and each imaginary driver is designed to carry out an appropriate operation to accomplish the given driving intention under varying conditions of the vehicle's driving environment. The system 1 compares an operation of the real driver to an operation of each of the plurality of imaginary drivers. The system 1 determines an estimate of driving intention of the real driver based on a degree of similarity between the operation of the real driver and the operation of each of the plurality of imaginary drivers. In one embodiment, the system 1 estimates a driving intention of the real driver based on a time series of likelihood values over a predetermined period from a past point in time to the present point in time.

The vehicle's surrounding detector 10 includes a front camera that covers a field of front view, a yaw angle sensor, and a yaw rate sensor. The front camera acquires image on road conditions, for example, within the field of front view. The vehicle's surrounding detector 10 detects an in-lane lateral distance of the own vehicle within a lane, and a yaw angle of the own vehicle with respect the lane, and the yaw rate. The vehicle's surrounding detector 10 detects an in-lane lateral position of the preceding vehicle ahead. The vehicle's surrounding detector 10 is equipped with an image processor that processes the acquired image by the front camera.

The vehicle's status detector 20 includes a vehicle speed sensor that detects a vehicle speed of the own vehicle. The real driver's operation detector 30 includes a steering angle sensor that is provided in a steering system to detect a steering angle of the own vehicle.

The first imaginary driver's operation calculator 40, second imaginary driver's operation calculator 50, selector 60, likelihood calculator 50, and driver's driving intention estimator 60 are implemented using one or more microcomputers or microcontrollers executing microcode, software programs and/or instructions. The microcode and/or software reside in volatile and/or non-volatile data storage devices and/or machine-readable data storage medium such as read only memory (ROM) devices, random access memory (RAM) devices, SRAM, PROM, EPROM, CD-ROM, disks, carrier waves, etc.

In one embodiment, two types of imaginary drivers are used to estimate the driving invention of the real driver. Information related to the two types of imaginary drivers is generated based on different types of information related to the driving of the own vehicle.

Each of the first and second imaginary driver's operation calculators 40 and 50 is configured to calculate a respective operation of each imaginary driver in driving the own vehicle to accomplish a driving intention given to each imaginary driver. Based on the relative relationship between the own vehicle and the lane marker, which relationship is detected by the vehicle's surrounding detector 10, the first imaginary driver's operation calculator 40 calculates a respective operation of each of a plurality of imaginary drivers of a first type in driving the own vehicle to accomplish the associated driving intention. Based on the relative relationship between the own vehicle and the preceding vehicle, which relationship is detected by the vehicle's surrounding detector 10, the second imaginary driver's operation calculator 50 calculates a respective operation of each of the plurality of imaginary drivers of a second type in driving the own vehicle to accomplish the associated driving intention.

The selector 60 is configured to select the imaginary drivers of the first type or the imaginary drivers of the second type.

The likelihood calculator 70 is configured to calculate a respective likelihood value associated with each of the plurality of imaginary drivers corresponding to the selected type of imaginary drivers as selected by the selector 60, with respect to the detected operation of the real driver, as detected by the real driver's operation detector 30, to give a time series of the calculated likelihood values for each of the plurality of imaginary drivers of the selected type over a predetermined period of time ending with the present moment. The driver's driving intention estimator 80 is configured to estimate a driving intention of the real driver after comparing one time series of the calculated likelihood values for one of the plurality of imaginary drivers of the selected type with another time series.

Referring to FIG. 2, the operation of the driver's driving intention estimating system 1 is explained. The flow chart in FIG. 2 illustrates a driver's driving intention estimating processing program. Execution of this program is repeated at a regular interval of, for example, 50 milliseconds.

In FIG. 2, step S101 is provided to judge whether or not the vehicle's surrounding detector 10 is detecting lane markers defining a lane, which the own vehicle is traveling on. This judgment involves scanning data given by image processing the image acquired by the front camera to detect obstacle(s) existing within the field of a view in front of the own vehicle. The obstacles to be detected within the field of the front view are lane markers defining the own lane. Accordingly, what is done at step S101 is a judgment on whether or not the processed image involves lane markers.

Figure 3:
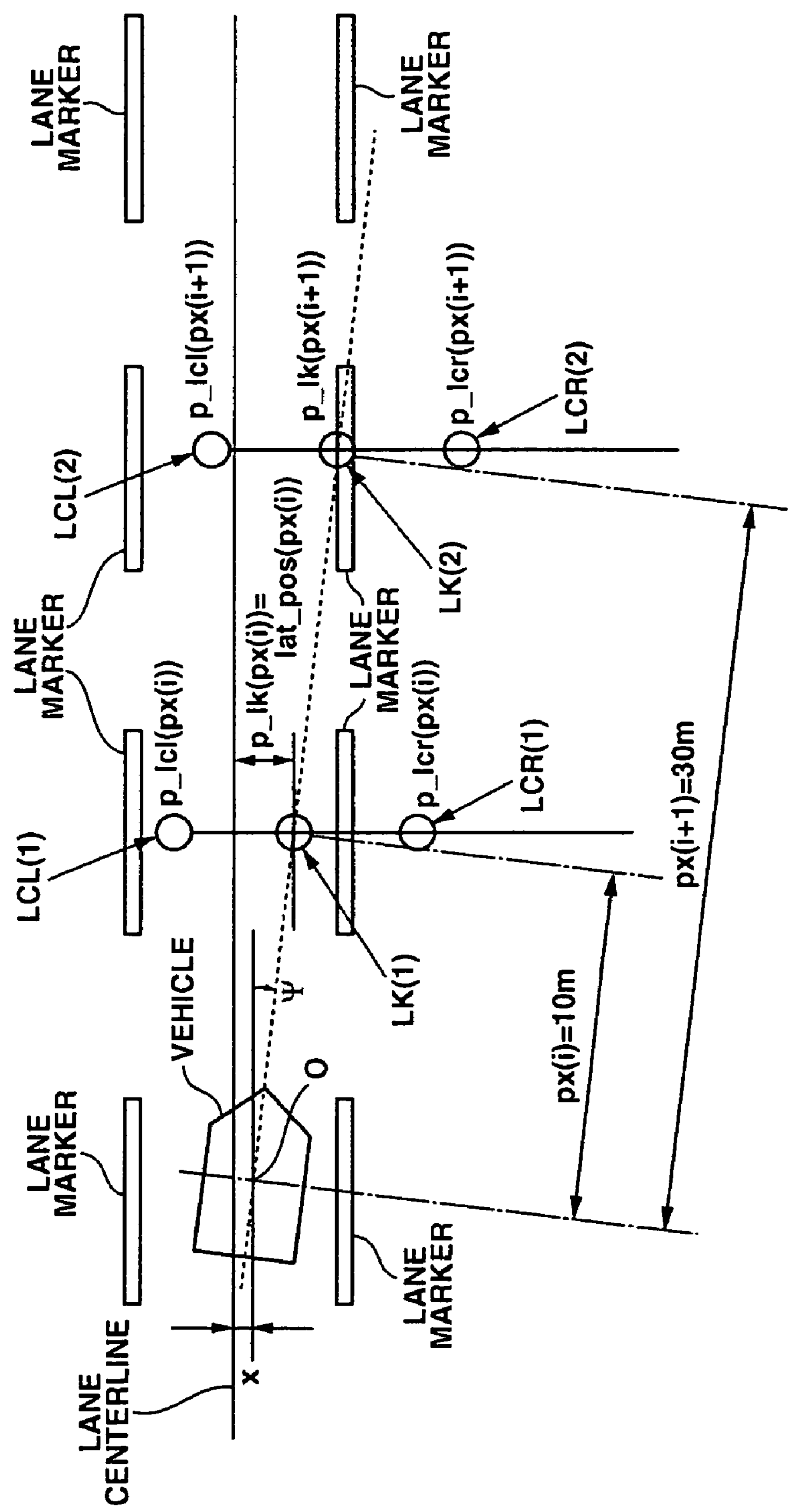
FIG. 3 illustrates an example to calculate an operation of each imaginary (or hypothetical) driver as directed by a given driving intention in operating the own vehicle.

If this interrogation at step S101 results in affirmative, indicating that the lane markers are being detected, the program proceeds to step 102 that is provided to read an in-lane lateral position x of the own vehicle, i.e., a lateral position within a lane (or track), and a yaw angle ψ of the own vehicle. As shown in FIG. 3, the in-lane lateral position x is a distance of a center O of the own vehicle from the centerline of the lane, and the yaw angle ψ is an angle through which the own vehicle has turned relative to the centerline of the lane. Besides, in preparation for calculation of operations of the plurality of imaginary drivers in case of failure to detect lane markers, step S102 also detects an in-lane lateral position x1 of the preceding vehicle ahead.

Next step S103 is provided to calculate an operation of each of a plurality of imaginary drivers of a first type. The operations calculated are called first operations Oid_1 calculated based on the relative relationship of the own vehicle to lane markers. In the exemplary embodiment, three imaginary drivers are utilized, including an imaginary driver A having a lane-keeping intention (LK), an imaginary driver B having a lane-change intention to the right (LCR), and an imaginary driver C having a lane-change intention to the left (LCL). The first operation Oid_1 of each of these three imaginary drivers A, B and C is calculated. The first operation Oid_1 of each of the imaginary drivers A, B and C is needed to accomplish one of the three different driving intentions given to the imaginary driver. More particularly, the first operation Oid_1 is a steering angle θid, by which each of the three imaginary drivers A, B and C manipulates a steering wheel in driving the own vehicle to accomplish the given driving intention. The following description discusses how the first operation Oid_1 is calculated.

(1) Imaginary Driver A having a Lane-Keeping Intention (LK):

To calculate a steering angle θid_lk, by which the imaginary driver A manipulates a steering wheel in driving the own vehicle to accomplish the lane-keeping intention (LK), at least one reference point LK(i) is placed in front, on a longitudinal centerline, of the own vehicle at a distance px(i) from the center O of the own vehicle, and a lateral position p_lk (px(i)) of the reference point LK(i) from a centerline of a lane is calculated. At least one reference point LK(i) includes any desired number of reference points LK(i). In this example, as shown in FIG. 3, two reference points LK(1) and LK(2) are placed on the longitudinal centerline of the own vehicle at different distances px(1) and px(2) from the center O of the own vehicle. The setting was made that the distance px(1)=10 m and the distance px(2)=30 m. The distance px(i) may have varying values with different vehicle speeds.

A lateral distance lat_pos(px(i)) of the reference point LK(i) from the centerline of the lane is dependent on, and thus determined by, the yaw angle ψ and the distance px(i), which may be, for example, given by processing the acquired image from the front camera. Thus, the lateral position p_lk(px(i)) of the reference point LK(i) may be expressed as:

$$p\_lk(px(i))=\text{lat\_pos}(px(i))\ i=\{1, \ldots, n\} \quad \text{(Eq. 1)}$$

The number n is equal to 2 (n=2) in the example shown in FIG. 3.

Using the lateral position p_lk(px(i)), the steering angle θid_lk may be expressed as:

$$\theta id\_lk=\Sigma\{a(i)\times p\_lk(i))\} \quad \text{(Eq. 2)}$$

where: a(i) is an appropriately determined coefficient weighting the lateral position p_lk(px(i)) and is determined based on characteristics of vehicles, such as the gear ratio of a vehicle implementing the system disclosed herein.

(2) Imaginary Driver B having a Lane-Change Intention to the Right (LCR):

To calculate a steering angle θid_lcr, by which the imaginary driver B manipulates a steering wheel in driving the own vehicle to accomplish the lane-change intention to the right (LCR), at least one reference point LCR(i) is placed. At least one reference point LCR(i) includes any desired number of reference points LCR(i). In this example, as shown in FIG. 3, two reference points LCR(1) and LCR(2) are placed.

A lateral position p_lcr(px(i)) of the reference point LCR (i) may be given as a sum of lat_pos(px(i)) and a predetermined offset lc_offset_lcr, and thus expressed as:

$$p\_lcr(px(i))=\text{lat\_pos}(px(i))+lc\_\text{offset}\_lcr\ i=\{1, \ldots, n\} \quad \text{(Eq. 3)}$$

The number n is equal to 2 (n=2) in the example shown in FIG. 3. The predetermined offset lc_offset_lcr is an appropriately determined value for giving the lateral position p_lcr(px(i)) of the reference point LCR(i). In this example, the offset lc_offset_lcr is equal to −1.75 (lc_offset_lcr=−1.75).

Using the lateral position p_lcr(px(i)), the steering angle θid_lcr may be expressed as:

$$\theta id\_lcr=\Sigma\{a(i)\times p\_lcr(px(i))\} \quad \text{(Eq. 4)}$$

where: a(i) is an appropriately determined coefficient weighting the lateral position p_lcr(px(i)) and is determined based on characteristics of vehicles, such as the gear ratio of a vehicle implementing the system disclosed herein.

(3) Imaginary Driver C having Lane-Change Intention to the Left (LCL):

To calculate a steering angle θid_lcl, by which the imaginary driver C manipulates a steering wheel in driving the own vehicle to accomplish the lane-change intention to the left (LCR), at least one reference point LCL(i) is placed. At least one reference point LCL(i) includes any desired number of reference points LCL(i). In this example, as shown in FIG. 3, two reference points LCL(1) and LCL(2) are placed.

A lateral position p_lcl(px(i)) of the reference point LCL(i) may be given by a sum of lat_pos(px(i)) and a predetermined offset lc_offset_lcl, and thus expressed as:

$$p\_lcl(px(i))=\text{lat\_pos}(px(i))+lc\_\text{offset}\_lcl\ i=\{1, \ldots, n\} \quad \text{(Eq. 5)}$$

The number n is equal to 2 (n=2) in the example shown in FIG. 3. The predetermined offset lc_offset_lcl is an appropriately determined value for giving the lateral position p_lcl(px(i)) of the reference point LCL(i). In this example, the offset lc_offset_lcl is equal to 1.75 (lc_offset_lcr=1.75).

Using the lateral position p_lcl(px(i)), the steering angle θid_lcl may be expressed as:

$$\theta id\_lcl=\Sigma\{a(i)\times p\_lcl(px(i))\} \quad \text{(Eq. 6)}$$

where: a(i) is an appropriately determined coefficient weighting the lateral position p_lcl(px(i)) and is determined based on characteristics of vehicles, such as the gear ratio of a vehicle implementing the system disclosed herein.

After calculating the first operation Oid_1 of each of the imaginary drivers A, B and C of the first type at step S103, the program goes to step S121. If the interrogation at step S101 results in negative, the program goes to step S111 for calculation of a respective operation Oid_2 of each of a plurality of imaginary drivers of a second type based on information different from the relative relationship of the own vehicle to the lane marker. In this example, the number of the imaginary drivers of the second type is set to the same as the imaginary drivers of the first type.

Step S111 is provided to judge whether or not the judgment at step S101 that lane marker has not been detected is made for the first time in the present cycle. If, although lane marker was detected in the last cycle, the detection of lane marker is lost for the first time in the present cycle, the program goes to step S112. Step S112 is provided to set an in-lane lateral position x of the own vehicle, yaw angle ψ and an in-lane lateral position x1 of the preceding vehicle x1, which were stored by reading operation in the last cycle, are set as initial values x0, ψ0 and x10, respectively. If the interrogation at step S111 results in negative, the program directly goes to step S113 bypassing step S112.

Figure 4:
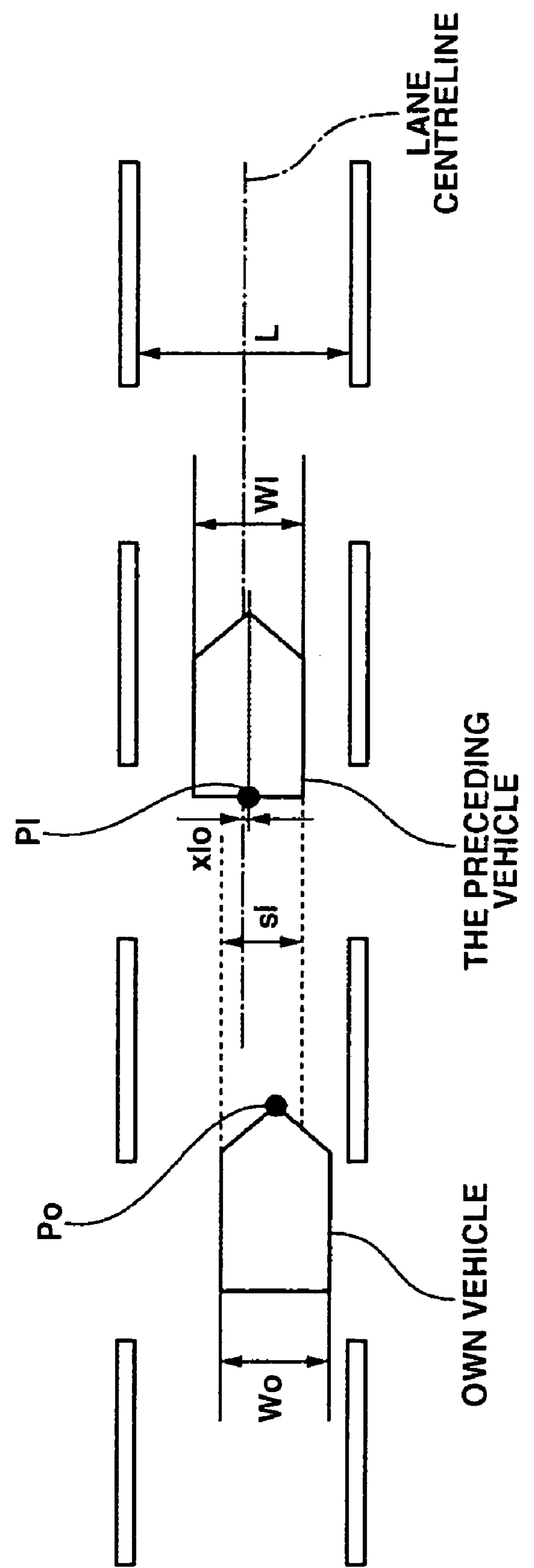
FIG. 4 illustrates how to recognize an in-lane position of the own vehicle in relation to the preceding vehicle.

Step S113 is provided to calculate an overlapping ratio S between the own vehicle and the preceding vehicle. Referring to FIG. 4, the manner of calculating the overlapping ratio S is explained. The overlapping ratio S is indicative of a lap of a width Wo of the own vehicle with respect to a width Wl of the preceding vehicle ahead. As shown in FIG. 4, a lap sl of the width Wo of the own vehicle on the width Wl of the preceding vehicle. A ratio sx of the lap sl to the width Wl of the preceding vehicle is calculated. The ratio sx may be expressed as:

$$sx=sl/Wl \quad \text{(Eq. 7)}$$

Using this ratio sx, the overlapping ratio S may be expressed as:

$$S=sgn(dx)\times(sx) \quad \text{(Eq. 8)}$$

In the equation (Eq. 8), dx represents a value indicative of an offset direction of a middle point between two lateral ends of the own vehicle from a middle point between two lateral ends of the preceding vehicle. As shown in FIG. 4, if the middle point Po between two lateral ends of a front of the own vehicle is offset to the right from the middle point Pl between two lateral ends of a rear of the preceding vehicle, dx is equal to +1 (dx=+1). If the middle point Po of the own vehicle is offset to the left from the middle point Pl of the preceding vehicle, dx is equal to −1 (dx=−1). Sign sgn (dx) is +1 if dx=+1, and −1 if dx=−1.

Figure 5:
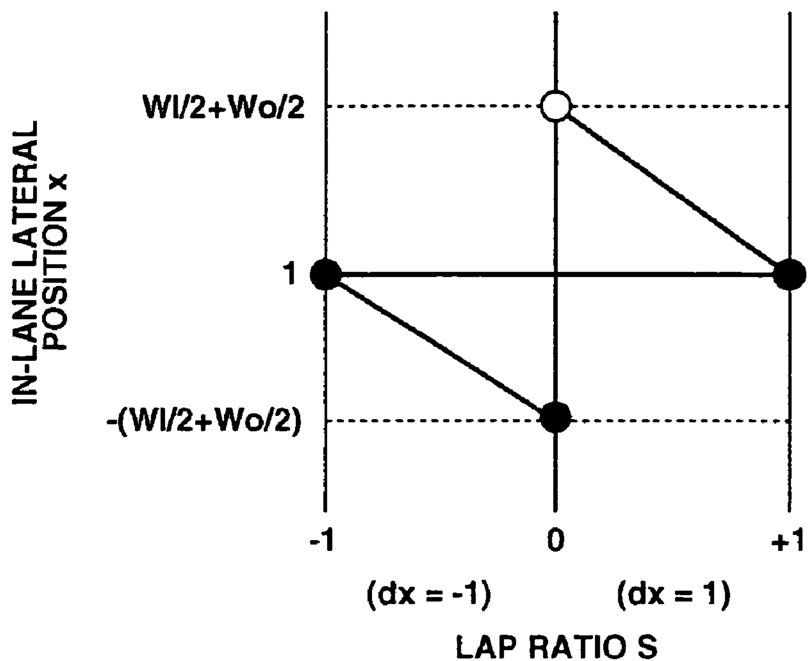
FIG. 5 illustrates varying of the in-lane position of the own vehicle with different values of an overlapping ratio S with respect to the preceding vehicle.

Next, step S114 is provided to calculate an in-lane lateral position x of the own vehicle using the overlapping ratio S calculated at step S113. FIG. 5 illustrates the relationship between the overlapping ratio S between the own vehicle and the preceding vehicle and the in-lane lateral position x of the own vehicle. The sign of in-lane lateral position x is plus (+) in a direction to the right from the lane centerline and it is minus (−) in a direction to the left from the lane centerline. As readily seen from FIG. 5, the in-lane lateral position x expressed using the overlapping ratio S falls in a predetermined range and may be expressed as $-(Wl/2+Wo/2)\leqq x\leqq(Wl/2+Wo/2)$.

Referring to FIG. 5, the in-lane lateral position x is zero (x=0) if the overlapping ratio S is +1 or −1 (S=±1) indicating that the width Wo of the own vehicle completely overlaps the width Wl of the preceding vehicle. As the overlapping ratio S approaches 0 from +1, the in-lane lateral position x increases in a plus direction. This is the case when the own vehicle is being offset from the preceding vehicle in the direction to the right as shown in FIG. 4. As the overlapping ratio approaches 0 from −1, the in-lane lateral position x increases in a minus direction. This is the case when the own vehicle is being offset from the preceding vehicle in the direction to the left.

Next step S115 is provided to calculate a yaw angle ψ. The yaw angle ψ is given by adding a time integral of a yaw rate (ψ over-dot) detected by the yaw rate sensor to the yaw angle initial value ψ0.

Step 116 is provided to compare a lateral, acceleration Xg of the own vehicle detected by the lateral acceleration sensor and the time rate Sv of the overlapping ratio S that is calculated at step S114 to predetermined values Xg0 and Sv0, respectively. If the lateral acceleration Xg is not greater than Xg0 ($Xg\leqq Xg0$) and the overlapping ratio time rate Sv is not less than Sv0 ($Sv\leqq Sv0$), it is judged that accurate calculation of the in-lane lateral position x cannot carried out because the preceding vehicle moves laterally too frequently. If this is the case, the program goes to step S117 to stop estimating a driving intention by setting a value corresponding to the stopping of driving intention estimation.

If the interrogation at step S116 results in negative, the program goes to step S118 to set a threshold T for estimation of intention for lane-change based on the overlapping ratio S. The threshold T is a value to be compared with a lane-change intention score Sc to be described later. Increasing the threshold T reduces errors in estimating a driving intention for lane-change, but lowers the frequency in accurately estimating the driving intention for lane-change when the real driver has intention to change for the adjacent lane. Decreasing the threshold T increases the frequency in accurately estimating a driving intention for lane-change when the real drive has intention to change for the adjacent lane, but increases the frequency in erroneously estimating the driving intention for lane-change.

Accounting for balance between the frequency in erroneously estimating a driving intention for lane-change and the frequency in accurately estimating the driving intention determines the threshold T. The setting is such that when lane marker is being detected, the threshold T is equal to T0 (T=T0), where T0=0.5.

Accuracy with which operation of each of imaginary drivers is calculated after calculating the in-lane lateral position x based on the overlapping ratio S is considered to be less than accuracy with which the operation of each imaginary driver is calculated based on lane marker detected via the front camera. Accordingly, the threshold T is set at a value larger than the value T0 in order to lower the frequency in erroneously estimating a driving intention for lane-change.

Figure 6:
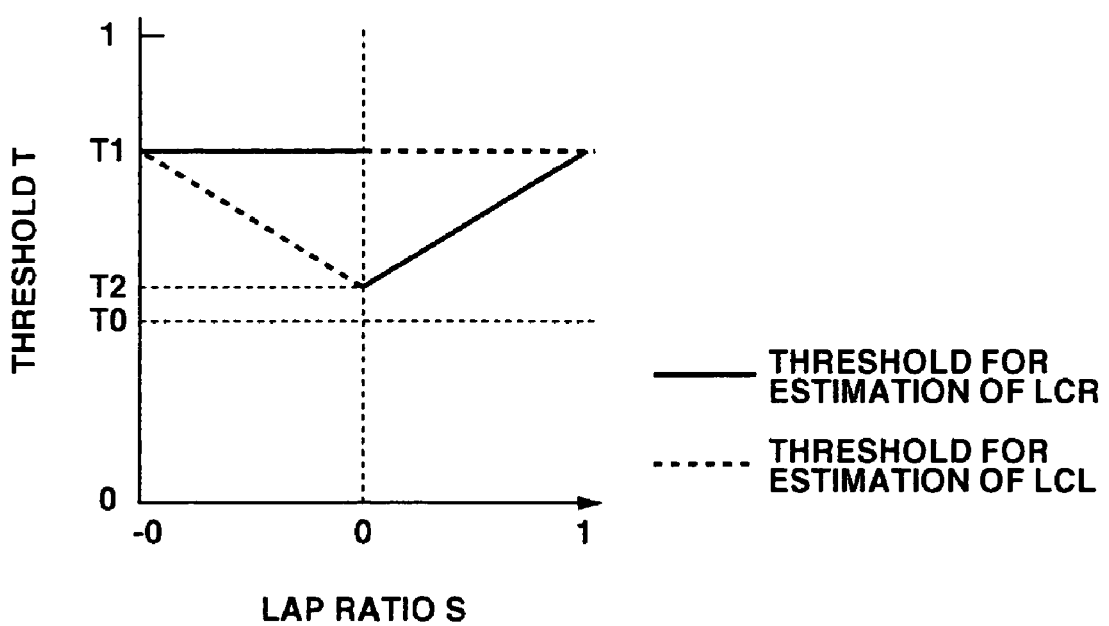
FIG. 6 illustrates varying of a lane-change threshold T with different values of the overlapping ratio S.

FIG. 6 shows the relationship between the overlapping ratio S and threshold T. As shown in FIG. 6, the threshold T is set a predetermined value T1 when the overlapping ratio S is +1 or −1 (S=±1) because lane-change possibility is low when the own vehicle completely overlaps the preceding vehicle. When the own vehicle is being offset to the right from the preceding vehicle, the threshold for estimation of lane-change to the right (LCR) is decreased as the overlapping ratio S approaches toward 0 (zero), as indicated by the fully drawn line. In this case, the threshold for estimation of lane-change to the left (LCL) is fixed at the predetermined value T1, as indicated by the broken line, because lane-change possibility to the left is low when the own vehicle is being offset to the right from the preceding vehicle.

When the own vehicle is being offset to the left from the preceding vehicle, the threshold for estimation of lane-change to the left (LCL) is decreased as the overlapping ratio S approaches toward zero, as indicated by the broken line. In this case, the threshold for estimation of lane-change to the right (LCR) is fixed at the predetermined value T1, as indicated by the fully drawn line, because lane-change possibility to the right is low when the own vehicle is being offset to the left from the preceding vehicle.

When the overlapping ratio S is 0 (S=0), the threshold T is set at a predetermined value T2 because the lane-change possibility is high when the own vehicle does not overlap the preceding vehicle. The predetermined values T0, T1 and T2 has the relationship that T0<T1<To2. The threshold for estimation of lane-change to the right (LCR) or the threshold for estimation of lane-change to the left (LCL) is selected as the threshold T. This selection is determined based on selection of a likelihood-series value Pids_lcr for lane-change to the right (LCR) or a likelihood-series value Pids_lcl for lane-change to the left (LCL), which are described later in connection with equation (Eq. 11).

As described earlier, in this embodiment, the number of the imaginary drivers of the second type is set to be the same as that of the imaginary drivers of the first type. In FIG. 2, step S119 is provided to calculate the respective operation of each of the three imaginary drivers A, B and C of the second type based on the in-lane lateral position x of the own vehicle, which has been calculated at step S114, and the yaw angle ψ, which has been calculated at step S115. The calculated operation of each of the imaginary drivers of the second type at step S119 is called a second operation Oid_2. The second operation Oid_2 is calculated in the same manner as explained for calculation of the first operation Oid_1 for the imaginary drivers of the first type at step S103.

From step S119 or S103, the program goes to step S121. Step S121 is provided to read a current steering angle θrd detected by the real driver operation detector 30 as an operation Ord of the real driver of the own vehicle.

The next step S122 is provided to calculate a likelihood value Pid of each imaginary driver using the calculated operation of each imaginary driver and the detected operation Ord of the real driver. This calculated operation of each imaginary driver may take the first operation Oid_1 calculated at step S103 based on the relative relationship of the own vehicle to the detected lane marker or the second operation Oid_2 calculated at step S119 based on relative relationship of the own vehicle to the preceding vehicle. When the lane marker is being detected via the front camera, the first operation Oid_1, which corresponds to imaginary drivers of the first type, is selected. When the detection of lane marker is lost, the second operation Oid_2, which corresponds to imaginary drivers of the second type, is selected.

In this discussion, a likelihood value Pid_lk of the imaginary driver A for lane-keeping intention, a likelihood value Pid_lcr of the imaginary driver B for lane-change to the right intention, and a likelihood value Pid_lcl of the imaginary driver C for lane-change to the left intention are generally denoted as the likelihood value Pid. In the same manner, the calculated steering angles θid_lk, θid_lcr and θid_lcl of the imaginary drivers A, B and C are generally denoted as the steering angle θid.

The likelihood value Pid of each imaginary driver is a logarithmic probability of a normalized value of the imaginary driver's steering angle θid against a normal distribution, where the mean (e) is the real driver's steering angle θrd and the variance (σ) is a predetermined value ρrd such as a standard deviation of steering angles. The likelihood value Pid may be expressed as:

$$Pid=\log\{\mathrm{Prob}n[(\theta id-\theta rd)/\rho rd]\} \quad \text{(Eq. 9)}$$

where: Probn is the probability density function that is used to calculate a probability with which a given sample is observed from a population expressed by the normal distribution.

Step S122 is provided to calculate a likelihood value Pid-lk for lane-keeping (LK), a likelihood value Pid-lcr for lane-change to the right (LCR), and a likelihood value Pid-lcl for lane-change to the left (LCL) using the above equation (Eq. 9). These values are calculated at current moment t and generally denoted as Pid(t).

Step S123 is provided to calculate a likelihood-series value Pids over a predetermined period of time from the present moment back to a past moment. Specifically, a respective likelihood-series value Pid for each of the different driving intentions is calculated using m, in number, likelihood values Pid(t) calculated over a predetermined period of time from the present moment t backward to a past moment (t−m+1) and stored at memory locations. In the embodiment, a likelihood-series value Pids_lk for lane-keeping intention (LK), a likelihood-series value Pids_lcl for lane-change to the left and a likelihood-series value Pids_lcr for lane-change to the right are generally denoted as the likelihood-series value Pids. The likelihood value Pids may be expressed as:

$$Pids=\prod_{i=1}^{m} Pid(t-i+1) \quad \text{(Eq. 10)}$$

where: Π represent a product of m number of likelihood values from a likelihood value Pid(t) calculated at the present moment t back to a likelihood value Pid(t−m+1) calculated at a past moment (t−m+1).

Figure 7:
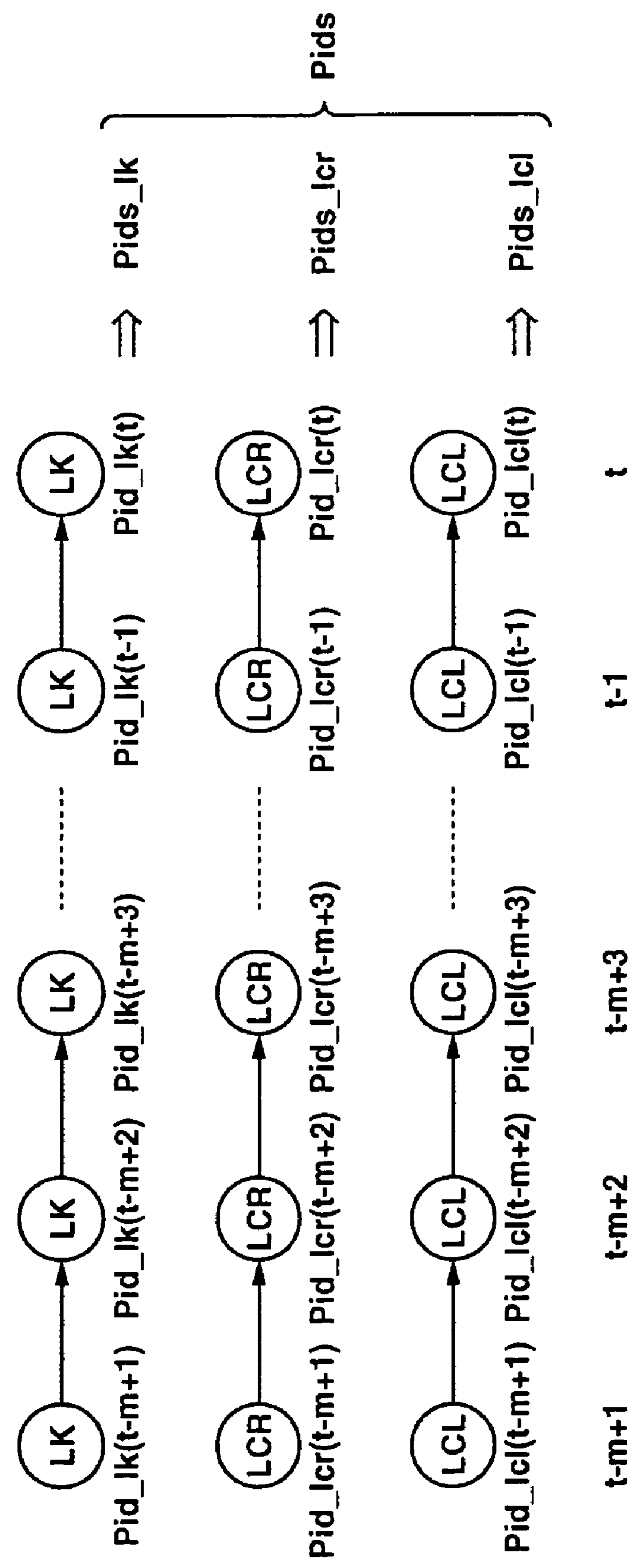
FIG. 7 depicts an example of memory space that includes locations for storing likelihood values associated with different moments in time for imaginary drivers.

Referring to FIG. 7, three memory portions, namely, first, second and third memory portions, are provided for the lane-keeping intention (LK), lane-change intention to the right (LCR) and lane-change intention to the left (LCL) possessed by three imaginary drivers A, B and C, respectively. The first memory portion for the lane-keeping intention (LK) possessed by the imaginary driver A stores a LK series of m number of current and past likelihood values for the present moment (t) back to a past moment (t−m+1). The LK series of m number of likelihood values are stored at locations indicated at Pid_lk(t), Pid_lk(t−1) . . . , and Pid_lk(t−m+1). The second memory portion for the lane-change intention to the right (LCR) possessed by the imaginary driver B stores a LCR series of m number of current and past likelihood values from the present moment (t) back to the past moment (t−m+1). The LCR series of m number of likelihood values are stored at locations indicated at Pid_lcr(t), Pid_lcr(t−1) . . . , and Pid_lcr (t−m+1). The third memory portion for the lane-change intention to the left (LCL) possessed by the imaginary driver C stores a LCL series of m number of likelihood values from the present moment (t) back to the past moment (t−m+1). The LCL series of m number of likelihood values are stored at locations indicated at Pid_lcl(t), Pid_lcl(t−1) . . . , and Pid_lcl (t−m+1). For the purpose of illustration, Pid(t−i+1), where i=1, 2, 3 . . . m, is used to generally denote the LK series of Pid_lk(t)~Pid_lk(t−m+1), LCR series of Pid_lcr(t)~Pid_lcr (t−m+1) and LCL series of Pid_lcl(t)~Pid_lcl(t−m+1).

At step S123, the equation (Eq. 10) is calculated to give a likelihood-series value Pids_lk for LK, a likelihood-series value Pids_lcr for LCR, and a likelihood-series value Pids_lcl for LCL. A likelihood-series value Pids_lc for lane-change (LC) is set using the likelihood-series values Pids_lcr and Pids_lcl. The likelihood-series value Pids_lc may be expressed as:

$$Pids\_lc = \max[Pids\_lcr, Pids\_lcl] \quad \text{(Eq. 11)}$$

The likelihood-series value Pids_lk expresses a lane-keeping likelihood Pr(LK) of the real driver, and the likelihood-series value Pids_lc expressed a lane-change likelihood Pr(LC) of the rear driver. After calculating the likelihood Pr(LK) and Pr(LC), the program goes to step S124.

Step S124 is provided to estimate a driving intention of the real driver. Using the lane-keeping likelihood Pr(LK) and lane-change likelihood Pr(LC), a lane-change intention score Sc is calculated. This score Sc may be expressed as:

$$Sc = \frac{\log Pr(LK)}{\log Pr(LC) + \log Pr(LK)} \quad \text{(Eq. 12)}$$

The score Sc as expressed by the equation (Eq. 12) continuously varies between 0 and 1. The score Sc grows as lane-change confidence (probability) grows more than lane-keeping confidence does. The score Sc=0.5 when the lane-change confidence and the lane-keeping confidence are 50:50. The score Sc is equal to 1 (Sc=1) when the lane-change confidence is 100%.

Next, the lane-change intention score Sc is compared to the threshold T. The threshold T is set at T0 when the first operation Oid_1 of each imaginary driver is being used. However, the threshold T is set to the value determined at step S118 using the relationship as illustrated in FIG. 6 when the second operation Oid_2 of each imaginary driver is being used.

A driving intention for lane-change is estimated when the score Sc is greater than the threshold T. A driving intention for lane-keeping is estimated when the score Sc is equal to or less than the threshold T.

Step S125 is provided to provide, as an output λrd, the estimated driving intention obtained at step S124. When it is determined to stop estimating driving intention at step S117, this determination is provided as an output.

The first exemplary embodiment provides effects as follows:

(1) The first imaginary driver's operation calculator 40 is configured to calculate a respective operation Oid_1 of each of a plurality of imaginary drivers of a first type based on detected vehicle's surrounding. The respective operation Oid_1 of each of the plurality of imaginary drivers of the first type is needed to accomplish one of a plurality of different driving intentions given to the imaginary drivers. The second imaginary driver's operation calculator 50 is configured to calculate a respective operation Oid_2 of each of the plurality of imaginary drivers of the second type based on information different from the detected vehicle's surrounding. The respective operation Oid_2 of each of the plurality of imaginary drivers of the second type is needed to accomplish one of the plurality of different driving intentions given to the respective imaginary driver. The selector 60 is configured to select the first operations Oid_1 calculated based on the detected vehicle's surrounding, or the second operations Oid_2 calculated based on the information different from the detected vehicle's surrounding. The likelihood calculator 70 is configured to calculate a respective likelihood-series value Pids of the selected operation Oid of each of the plurality of imaginary drivers with respect to the first operation Ord of the real driver. The driver's driving intention estimator 80 is configured to estimate a driving intention of the real driver based on the calculated likelihood-series values Pids. Accordingly, a driving intention of the real driver is estimated in a stable manner based on likelihood-series value Pids of the respective second operation of each of the plurality of imaginary drivers with respect to the operation of the real driver even when the vehicle's surrounding used by the first imaginary driver's operation calculator 40 cannot be detected.

(2) When the operations of the imaginary drivers of the second type are selected by the selector 60, a criterion that is used by the driver's driving intention estimator 80 in estimating a driving intention of the real driver is set at a high or large value. Specifically, the threshold T is set at the predetermined value T0 when the first operations Oid_1 of the imaginary drivers calculated at the first imaginary driver's operation calculator 40 are being used. The threshold T is set at a value larger than the predetermined value T0 when the second operations Oid_2 calculated at the second imaginary driver's operation calculator 50 are being used in order to increase accuracy with which the lane-change driving intention is estimated. Accordingly, the frequency of error in estimating a lane-change driving intention can be reduced even under conditions when the vehicle's surrounding can not be detected so that calculation accuracy of the operations Oid_1 of the imaginary drivers may drop.

(3) The second imaginary driver's operation calculator 50 calculates the operations Oid_2 of the imaginary drivers of the second type based on the relative lateral relationship between the own vehicle and the preceding vehicle. Accordingly, the calculator 50 can calculate the operations Oid_2 of the imaginary drivers of the second type by considering actions, which the imaginary driver with lane-keeping intention may take against the preceding vehicle and by considering actions, which the imaginary driver with lane-change intention may take against the preceding vehicle.

(4) The second imaginary driver's operation calculator 50 calculates the operations Oid_2 of the imaginary drivers of the second type based on the overlapping ratio S between the own vehicle and the preceding vehicle. Accordingly, the calculator 50 can calculate the operations Oid_2 of the imaginary drivers by considering actions, which the imaginary drivers with different driving intentions may take against the preceding vehicle.

(5) As shown in FIG. 6, when the operations Oid_2 calculated at the second imaginary driver's operation calculator 50 are being selected, the smaller the absolute value of the overlapping ratio S, the smaller the threshold T. Accordingly, estimation of a lane-change driving intention can be made at an early timing when the overlapping ratio S is small so that lane-change possibility is high.

(6) The driver's driving intention estimator 80 is configured to stop estimating a driving intention when lateral acceleration Xg of the own vehicle is less than the predetermined value Xg0 and the time rate Sv of the overlapping ratio S is greater than the predetermined value. Accordingly, an error in estimating a driving intention can be avoided by stopping the estimation when the operations Oid_2 of the imaginary drivers cannot be accurately calculated based on the relative positional relationship of the own vehicle to the preceding vehicle due to large displacement of the preceding vehicle relative to lateral displacement of the own vehicle.

Second Exemplary Embodiment

The constituent of the second exemplary embodiment is substantially the same as that of the first exemplary embodiment shown in FIG. 1. The following descriptions address differences between the second exemplary embodiment and the first exemplary embodiment.

In the second exemplary embodiment, when lane marker is not detected by a front camera, an in-lane lateral position x of an own vehicle is calculated based on a lateral distance xv of a middle point between lateral ends of the front of the own vehicle from a middle point between lateral ends of the rear of the preceding vehicle.

The operation of the second exemplary embodiment is described in detail using FIG. 8. FIG. 8 is a flow chart illustrating process steps of a driving intention estimating program in the driving intention estimating system. Execution of this program is repeated at a regular interval of 50 milliseconds.

The flow chart illustrated in FIG. 8 has steps S201, S202 and S203, which correspond exactly to the steps S101, S102 and S103 of the flow chart illustrated in FIG. 2. Thus, description on the tasks of these steps is hereby omitted.

If, at step S201, it is judged that lane marker is not detected, the program goes to step S211 to judge whether or not the detection of lane marker is lost for the first time in the present cycle. If the detection of lane marker is lost for the first time in the present cycle, the program goes to step S212. Step S212 is provided to set an in-lane lateral position x of the own vehicle, yaw angle ψ and an in-lane lateral position x1 of the preceding vehicle x1, which were stored by reading operation in the last cycle, are set as initial values x0, ψ0 and x10, respectively. If the interrogation at step S211 results in negative, the program directly goes to step S213 bypassing step S212.

Figure 9:
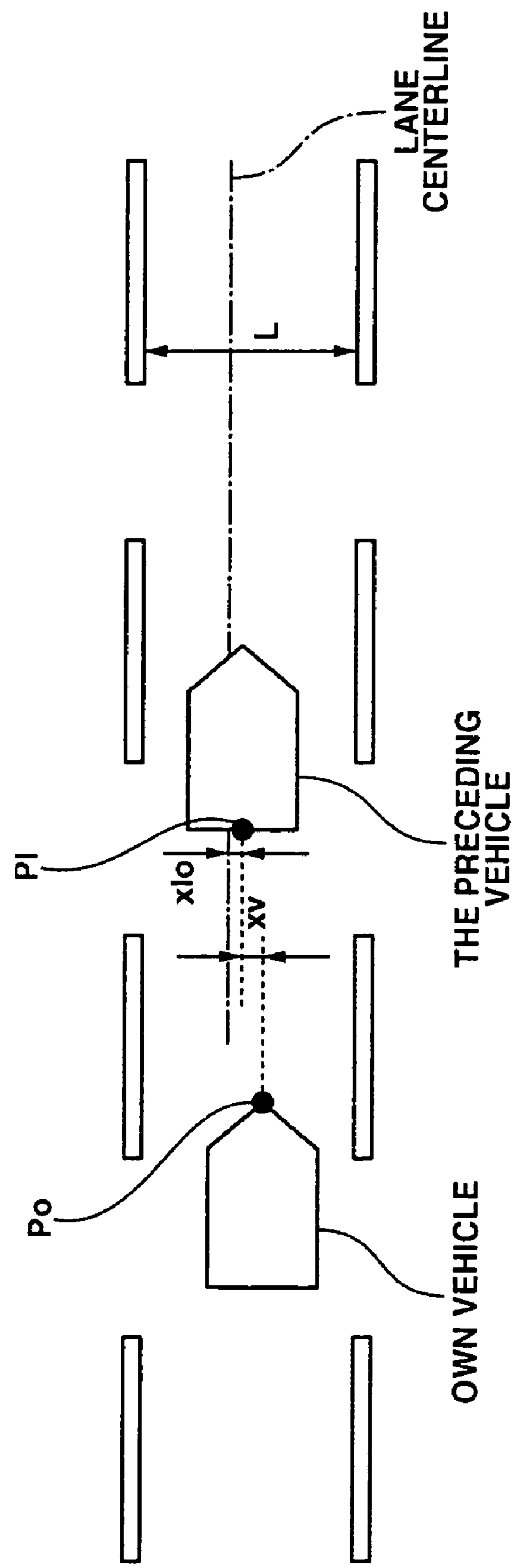
FIG. 9 illustrates another manner to recognize an in-lane position of the own vehicle in relation to the preceding vehicle.

Step S213 is provided to calculate a lateral distance xv between a middle point Pl between lateral ends of the rear of the preceding vehicle and a middle point Po between lateral ends of the front of the own vehicle as shown in FIG. 9. This lateral distance xv can be detected by analyzing the image signals covering a field of view in front of the own vehicle.

Next, step S214 is provided to calculate an in-lane lateral position x of the own vehicle. The in-lane lateral position x is given by adding the lateral distance xv calculated at step 213 to the in-lane lateral position x10 obtained at step S212. The in-lane lateral position x of the own vehicle may be expressed as:

$$x = x10 + xv \qquad \text{(Eq. 13)}$$

Next step S215 is provided to calculate a yaw angle ψ. The yaw angle ψ is given by adding a time integral of a yaw rate (ψ over-dot) detected by the yaw rate sensor to the yaw angle initial value ψ0. Step 216 is provided to compare a lateral acceleration Xg of the own vehicle detected by the lateral acceleration sensor and the time rate Sv of the overlapping ratio S that is calculated in the same manner as the first embodiment to predetermined values Xg0 and Sv0, respectively. If the lateral acceleration Xg is not greater than Xg0 ($Xg \leqq Xg0$) and the overlapping ratio time rate Sv is not less than Sv0 ($Sv \geqq Sv0$), the program goes to step S217 to stop estimating a driving intention by setting a value corresponding to the stopping of driving intention estimation. The time rate Sv of the overlapping ratio S may be replaced with the time rate of the lateral distance xv.

If the interrogation at step S216 results in negative, the program goes to step S218 to set a threshold T for estimation of intention for lane-change. Accuracy with which operation of each of imaginary drivers is calculated after calculating the in-lane lateral position x based on the lateral distance xv is considered to be less than accuracy with which the operation of each imaginary driver is calculated based on lane marker detected via the front camera. Accordingly, the threshold T is set at a value larger than the predetermined value T0 in order to lower the frequency in erroneously estimating a driving intention for lane-change.

Figure 10:
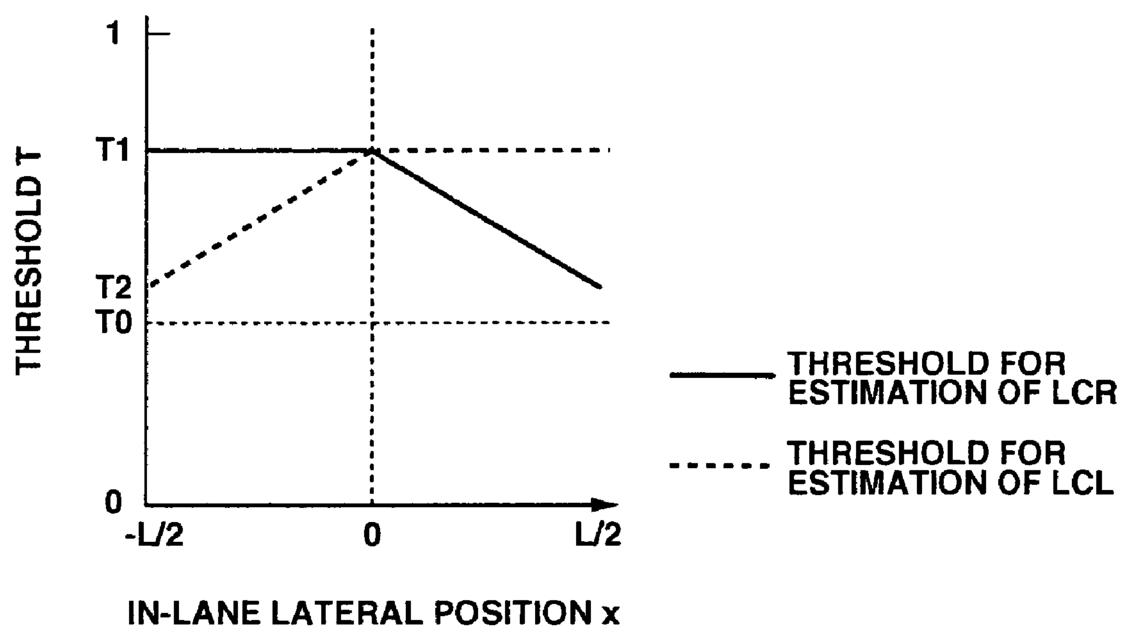
FIG. 10 illustrates different values of the lane-change threshold T relative to different values of the in-lane position of the own vehicle.

FIG. 10 shows the relationship between the in-lane lateral distance x of the own vehicle and the threshold T. As shown in FIG. 10, the threshold T is set a predetermined value T1 when the in-lane lateral position x is 0 (x=0) so that the own vehicle is in the lane centerline. As indicated by the broken line in FIG. 10, the threshold for estimation of lane-change to the left is set at the predetermined value T1 when the own vehicle stays on the right side of the lane centerline. As indicated by the fully drawn line in FIG. 10, the threshold for estimation of lane-change to the right is set at the predetermined value T1 when the own vehicle stays on the left side of the lane centerline.

As illustrated by the fully drawn line in FIG. 10, the threshold for estimation of lane-change to the right becomes small as the own vehicle approaches to the lane boundary on the right because the possibility of lane-change to the right is high. As illustrated by the broken line in FIG. 10, threshold for estimation of lane-change to the left becomes small as the own vehicle approaches to the lane boundary on the left because the possibility of lane-change to the left is high. The threshold T may be set against the lateral distance xv calculated at step S213. In this case, as the possibility of lane-change becomes high when the lateral distance xv increases, the threshold T becomes small.

Step S219 is provided to calculate the respective second operation Oid_2 of each of the imaginary drivers based on the in-lane lateral position x of the own vehicle, which has been calculated at step S214, and the yaw angle ψ, which has been calculated at step S215.

From step S219 or S203, the program goes to step S221. The flow chart of FIG. 8 has steps S221, S222, S223, S224 and S225, which correspond exactly to the steps S121, S122, S123, S124 and S125 of the flow chart illustrated in FIG. 2. Thus, description on the tasks of these steps is hereby omitted.

In addition to the effects provided by the first exemplary embodiment, the second exemplary embodiment provides the following effects:

(1) The second imaginary driver's operation calculator 50 calculates the respective second operation Oid_2 of each of the imaginary drivers of the second type based on the lateral distance xv between the middle point Po between the lateral ends of the front of the own vehicle and the middle point Pl between the lateral ends of the rear of the preceding vehicle. Accordingly, the calculator 50 can calculate the operations Oid_2 of the imaginary drivers of the second type by considering actions, which the imaginary drivers with different driving intentions may take against the preceding vehicle.

(2) When the operations Oid_2 calculated at the second imaginary driver's operation calculator 50 are selected, the larger the in-lane lateral position x, the smaller the threshold T. Accordingly, estimation of a lane-change driving intention can be made at an earlier time when the in-lane position x is small so that the lane-change possibility is high.

Third Exemplary Embodiment

The constituent of the third exemplary embodiment is substantially the same as that of the first exemplary embodiment shown in FIG. 1. The following descriptions mainly address differences of the third exemplary embodiment from the first exemplary embodiment.

In the third exemplary embodiment, when lane marker is not detected by a front camera, an in-lane lateral position x of an own vehicle is calculated based on a value x0 of the in-lane lateral position x when the lane marker has been lost and the lateral movement of the own vehicle.

The operation of the third exemplary embodiment is described in detail using FIG. 11. FIG. 11 is a flow chart illustrating process steps of a driving intention estimating program in the driving intention estimating system. Execution of this program is repeated at a regular interval of 50 milliseconds. The flow chart illustrated in FIG. 11 has steps S301, S302 and S303, which correspond exactly to the steps S101, S102 and S103 of the flow chart illustrated in FIG. 2. Thus, description on the tasks of these steps is hereby omitted.

If, at step S301, it is judged that lane marker is not detected, the program goes to step S311 to judge whether or not the detection of lane marker is lost for the first time in the present cycle. If the detection of lane marker is lost for the first time in the present cycle, the program goes to step S312. Step S312 is provided to set an in-lane lateral position x of the own vehicle, yaw angle ψ and an in-lane lateral position x1 of the preceding vehicle x1, which were stored by reading operation in the last cycle, are set as initial values x0, ψ0 and x10, respectively. If the interrogation at step S311 results in negative, the program directly goes to step S313 bypassing step S312.

Step S313 is provided to read in a lateral acceleration Xg detected by a lateral acceleration sensor and a yaw rate (ψ over-dot) detected by a yaw rate sensor. Next, step S314 is provided to calculate an in-lane lateral position x of the own vehicle. The second time integral of the lateral acceleration Xg is carried out to give a lateral displacement. Adding to this lateral displacement the initial value x0 of the in-lane lateral set at step S312 gives the current in-lane lateral position x of the own vehicle.

Next, step S315 is provided to calculate a yaw angle ψ. The yaw angle ψ is given by adding a time integral of the yaw rate (ψ over-dot) detected by the yaw rate sensor to the yaw angle initial value ψ0. Step 316 is provided to compare a lateral acceleration Xg of the own vehicle detected by the lateral acceleration sensor and the time rate Sv of the overlapping ratio S that is calculated in the same manner as the first embodiment to predetermined values Xg0 and Sv0, respectively. If the lateral acceleration Xg is not greater than Xg0 (Xg≦Xg0) and the overlapping ratio time rate Sv is not less than Sv0 (Sv≧Sv0), the program goes to step S317 to stop estimating a driving intention by setting a value corresponding to the stopping of driving intention estimation.

If the interrogation at step S316 results in negative, the program goes to step S318 to set a threshold T for estimation of intention for lane-change. Accuracy with which operation of each of imaginary drivers is calculated after calculating the in-lane lateral position x based on the lateral movement of the own vehicle as expressed by the lateral acceleration Xg is considered to be less than accuracy with which the operation of each imaginary driver is calculated based on lane marker detected via the front camera. Accordingly, the threshold T is set at a value larger than the predetermined value T0 in order to lower the frequency in erroneously estimating a driving intention for lane-change. Specifically, the relationship illustrated in FIG. 10 is utilized to set the threshold in response to the in-lane lateral position x of the own vehicle.

Step S319 is provided to calculate the respective second operation Oid_2 of each of the imaginary drivers of the second type based on the in-lane lateral position x of the own vehicle, which has been calculated at step S314, and the yaw angle ψ, which has been calculated at step S315.

From step S319 or S303, the program goes to step S321. The flow chart of FIG. 11 has steps S321, S322, S323, S324 and S325, which correspond exactly to the steps S121, S122, S123, S124 and S125 of the flow chart illustrated in FIG. 2. Thus, description on the tasks of these steps is hereby omitted.

In addition to the effects provided by the first exemplary embodiment, the third exemplary embodiment provides the following effects:

(1) The second imaginary driver's operation calculator 50 calculates the respective second operation Oid_2 of each of the imaginary drivers of the second type based on the in-lane lateral position x0 upon change for the second operations Oid_2 from the first operations Oid_1 and the lateral movement of the own vehicle. Accordingly, the calculator 50 can calculate the operations Oid_2 of the imaginary drivers from lateral movement of the own vehicle after detection of lane marker has been lost.

(2). The second imaginary driver's operation calculator 50 uses the lateral acceleration Xg of the own vehicle as the lateral movement of the own vehicle, so that it is possible to calculate the respective operation Oid_2 of each of the imaginary drivers of the second type after detection of lane marker has been lost.

Fourth Exemplary Embodiment

Figure 12:
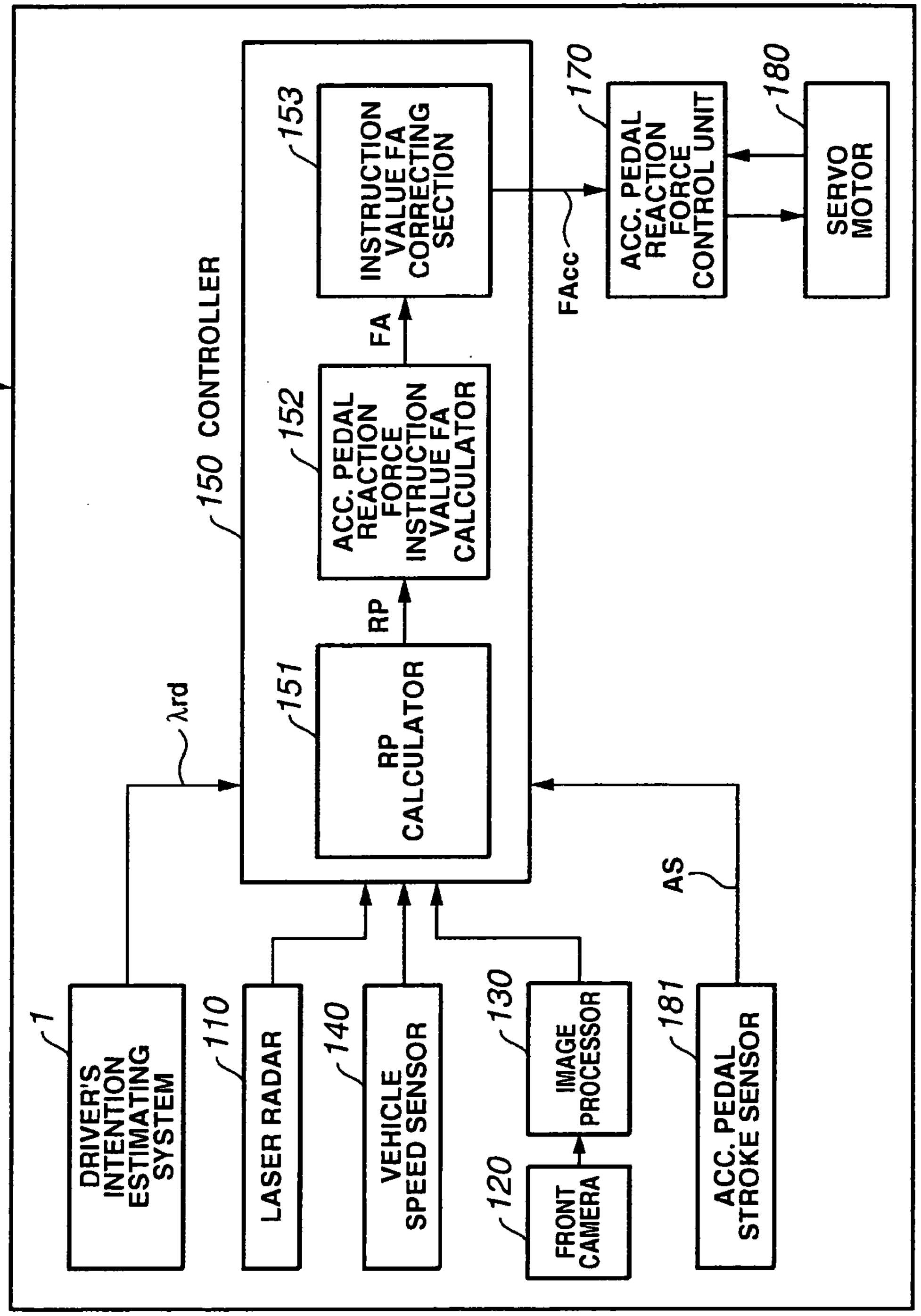
FIG. 12 is a block diagram illustrating a fourth exemplary embodiment of a driver assisting system according to the present disclosure.
Figure 13:
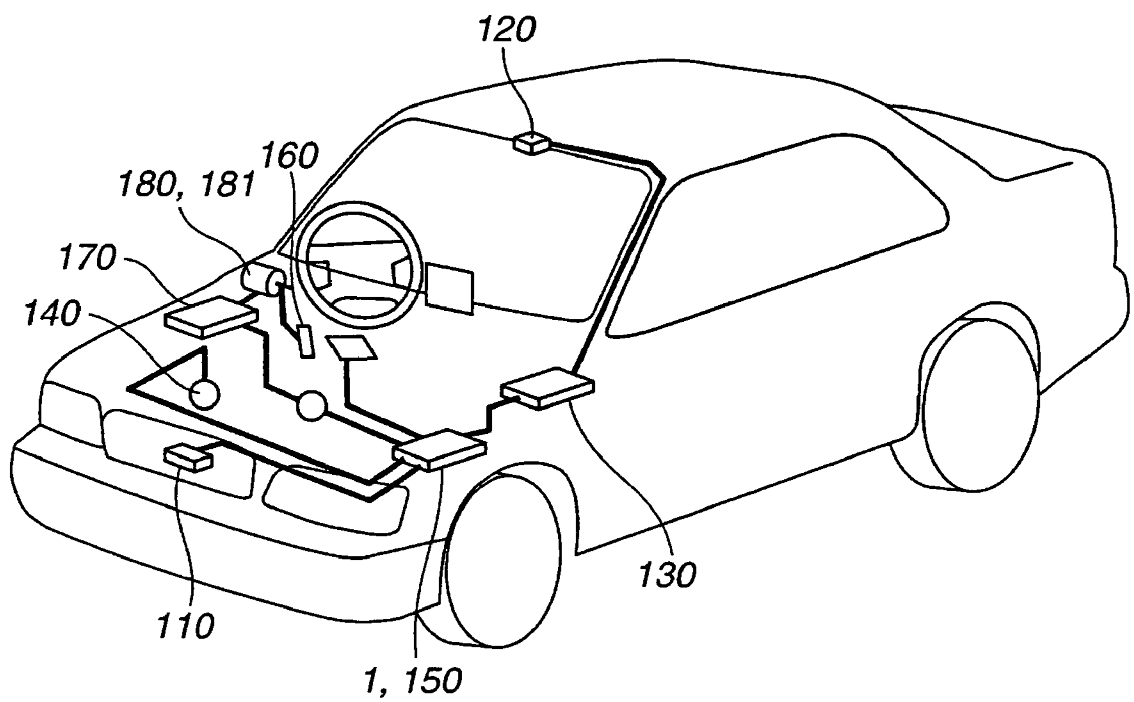
FIG. 13 is a perspective view of a vehicle incorporating a driver assisting system.

Referring to FIG. 12, an exemplary embodiment of a driver assisting system 100 according to the present disclosure is described. FIG. 13 illustrates an exemplary automobile installed with the driver assisting system 100. Using the driving intention estimating system 1 according to the first to the third exemplary embodiments, the driver assisting system 100 assists a real driver.

Laser radar 110 is positioned at a center of a front grill or a front bumper of the vehicle for transmitting infrared pulsed beam horizontally to scan a measurement region in front of the vehicle. The laser radar 10 measures reflected waves of the transmitted infrared beam returning from obstacles, such as, rear ends of the preceding vehicles, inside the measurement region and detects an inter-vehicle distance between the vehicle and each of the preceding vehicles and relative speed between them by analyzing arrival time of the reflected waves. The laser radar 110 provides the detected an inter-vehicle distance and relative speed to a controller 150. In the embodiment, the laser radar 110 can swivel the transmitted infrared pulsed beam horizontally and laterally about 6 degrees to each side of a longitudinal line passing through the center of the vehicle.

A front camera 120, which may be in the form of a small-sized CCD camera or a CMOS camera positioned at an upper portion of a front windshield, to detect image covering a road scene in front of the own vehicle. The front camera 120 provides image signals to an image processor 130. The image signals are processed by the image processor 130 and provided to the controller 150. The front camera 120 covers a region that extends horizontally and laterally about 30 degrees to each side of a longitudinal line passing through the center of the vehicle and captures, as image, road scenery ahead within this region.

A vehicle speed sensor 140 detects a vehicle speed of the own vehicle by measuring a revolution per minute of at least one of road wheels or a revolution per minute of an output member of a transmission, and provides the detected vehicle speed to the controller 150.

Further, the estimated result from the driving intention estimating system 1 and the process of estimating are provided to the controller 150.

The controller 150, which is responsible for information processing within the driver assisting system 100, may contain a microprocessor including a central processing unit (CPU), a read only memory (ROM), and a random access memory (RAM). The controller 150 includes, for example, software implementation of a risk potential (RP) calculator 151, a reaction force instruction value FA calculator 152, and an instruction value FA correcting section 153.

The RP calculator 151 calculates a risk potential (RP) in the surrounding of an own vehicle using a vehicle speed, an inter-vehicle distance and a relative speed to the preceding vehicle, which are given by the laser radar 110, vehicle speed sensor 140, and an image information on the surrounding of the own vehicle, which is given by the image processor 130. The accelerator pedal reaction force instruction value (FA) calculator 152 calculates an instruction value FA for an accelerator pedal reaction force from an accelerator pedal 160 based on the risk potential RP calculated at the risk potential calculator 151.

The instruction value FA correcting section 153 corrects the accelerator pedal reaction force instruction value FA based on the estimated result and the process of estimation from the driving intention estimating system 1. The corrected accelerator pedal reaction force FAcc is provided to an accelerator pedal reaction force control unit 170.

Figure 14:
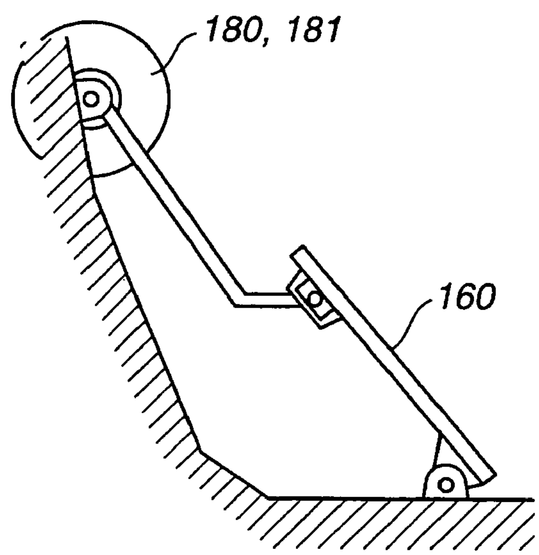
FIG. 14 illustrates a driver controlled input device, in the form of an accelerator pedal.

In response to the instruction value from the controller 150, the accelerator pedal reaction force control unit 170 regulates a servo motor 180 of the accelerator pedal 160. As shown in FIG. 14, the accelerator pedal 160 has a link mechanism including a servo motor 180 and an accelerator pedal stroke sensor 181. The servo motor 180 may provide any desired torque and any desired angular position in response to an instruction from the accelerator pedal reaction force control unit 170. The accelerator pedal stroke sensor 181 detects an accelerator pedal stroke or operation amount AS of the accelerator pedal 160 by measuring an angle of the servo motor 180. The angle of the servo motor 180 corresponds to the operation amount AS of the accelerator pedal 160 because the servo motor 180 and the accelerator pedal 160 are interconnected by the link mechanism.

When the accelerator pedal reaction force control unit 170 is not altering the reaction force, the reaction force increases linearly as the accelerator pedal operation amount AS increases. This ordinary reaction force varying characteristic is accomplished by a spring force provided by a torque spring arranged at the center of rotational movement of the accelerator pedal 160.

The controller 150 regulates accelerator pedal reaction force from the accelerator pedal 160 based on a risk potential RP in the surrounding of the own vehicle, specifically, a risk potential within respect to the preceding vehicle. If the accelerator pedal reaction force increases with an increase in potential that grows as the own vehicle approaches the preceding vehicle, the reaction force might interfere with operation of the accelerator pedal by the driver as the driver approaches the preceding vehicle to change for the adjacent lane. Accordingly, the reaction force from the accelerator pedal 160 is reduced when the driving intention estimating system 1 has estimated a driving intention for lane-change. Moreover, the reaction force is adjusted based on whether or not the estimation of lane-change intention has been made under circumstances where lane marker is not being detected.

As discussed before, the threshold T is set at a value greater than the predetermined value T0 when lane marker is not being detected, thus reducing the frequency of error estimation of lane-change intention while the driver has a lane-keeping intention. However, a timing of estimating a lane-change is delayed. Thus, the accelerator pedal reaction force is adjusted to compensate for this delay in estimating timing of lane-change when lane-change intention has been estimated under condition lane marker is not being detected.

Figure 15:
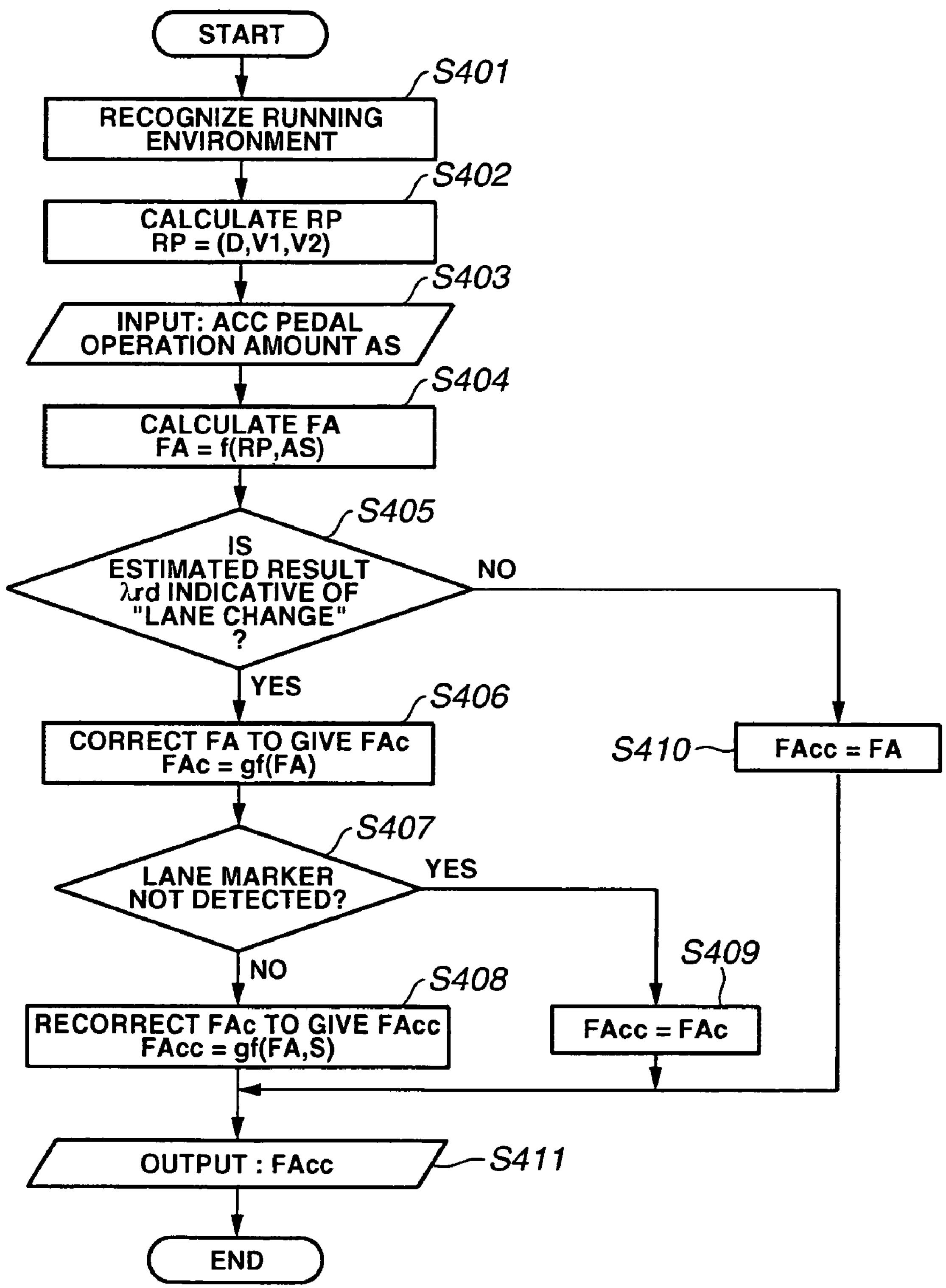
FIG. 15 is a flow chart illustrating the operation of the embodiment illustrated in FIG. 12.

Next, the following description along FIG. 15 provides more understanding of how the driver assisting system 100 works. The flow chart in FIG. 15 illustrates a driver assisting control program stored in the controller 150. The execution of the program is repeated at a regular interval of, for example, 50 msec.

In FIG. 15, at step S401, the controller 150 recognize running environment in a field around an own vehicle. In particular, the controller 150 receives, as inputs, signals of the laser radar 110, front camera 120 and vehicle speed sensor 140 by reading operations to acquire data regarding the vehicle's status and the vehicle's running environment. Imaging a traffic scene where the own vehicle is following the preceding vehicle, for example, the acquired data include a vehicle speed V1 of the own vehicle, a vehicle speed V2 of the preceding vehicle, and an inter-vehicle distance D between the own vehicle and the preceding vehicle. At step S402, the controller 150 calculates a risk potential RP around the own vehicle based on the running environment data obtained at step S401. In the exemplary embodiment, the controller 150 calculates a time to collision TTC and a time headway THW with respect to the preceding vehicle to calculate the risk potential RP.

The TTC is a measure of time from a present or current moment to a future moment when the distance D would become zero if the relative speed Vr (Vr=V2−V1) to the preceding vehicle remains unaltered. The TTC may be expressed as:

$$TTC=-D/Vr \quad \text{(Eq. 14)}$$

The smaller the value of TTC, the more imminent is the collision and the larger is the value of an extent the vehicle has approached the preceding vehicle. In the traffic scene where the own vehicle is following the preceding vehicle, most vehicle drivers perceived a high degree of risk and initiated deceleration to avoid collision well before the TTC becomes less than 4 seconds. To some extent, the TTC is a good indication for predicting a future behavior the vehicle driver might take. However, when it comes to quantifying the degree of risk, which the vehicle driver actually perceives, there is discrepancy between the TTC and the degree of risk. Thus, the TTC alone is insufficient to quantify the degree of risk.

Such discrepancy may be confirmed by considering a traffic scene where the relative speed Vr is zero. In this case, the TTC is infinite irrespective of how narrow the distance D is. However, the driver perceives an increase in the degree of risk in response to a reduction in the distance D, accounting for an increase in influence on the TTC by an unpredictable drop in a vehicle speed of the preceding vehicle.

To remedy the above-mentioned discrepancy, the notion of time headway THW has been introduced to quantify an increase how in influence on the TTC by an unpredictable drop in the vehicle speed of the preceding vehicle. The THW is a measure of a timer that is set to count up when the preceding vehicle reaches a point on a road and will be reset subsequently when the following vehicle will reach the same point. The THW is expressed as, $$THW=D/V1 \quad \text{(Eq. 15)}$$

In the case where the host vehicle is following the preceding vehicle, the vehicle speed V2 of the preceding vehicle may be used instead of the vehicle speed V1 in the above-mentioned equation (Eq. 15).

The relationship between the two notions TTC and THW is such that a change in vehicle speed V2, if any, of the preceding vehicle results in a small change in the TTC when the THW is long, but the same change in vehicle speed V2 of the preceding vehicle results in a large change in the TTC when the THW is short.

In this exemplary implementation, the risk potential RP calculated at step S402 may be expressed as:

$$RP=a/THW+b/TTC \qquad \text{(Eq. 16)}$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle is following the preceding vehicle. In this exemplary implementation, b=8 and a=1 (a<b).

At step S403, the controller 150 receives the operation amount AS of the accelerator pedal 160 by reading operation of the output of the accelerator pedal stroke sensor 181. At step S404, the controller 150 calculates an accelerator pedal reaction force instruction value FA based on the risk potential RP. First, the controller 150 calculates a reaction force increment ΔF in response to the risk potential RP by, for example, referring to the characteristic curve shown in FIG. 16.

Figure 16:
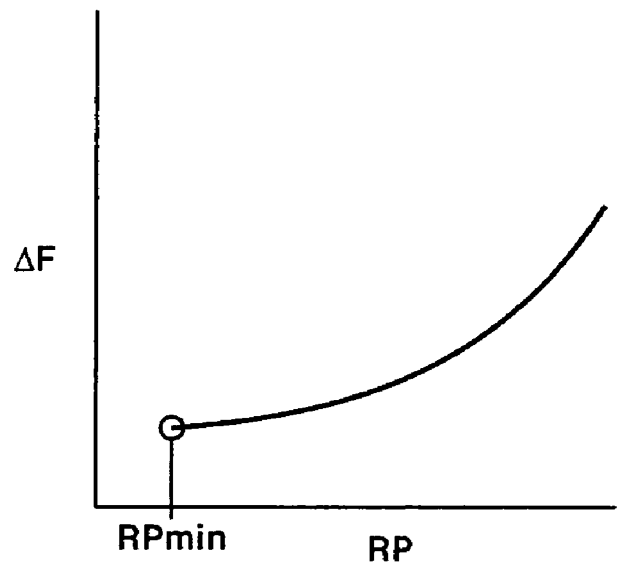
FIG. 16 illustrates an increase ΔF in reaction force relative to different values of risk potential RP.

The illustrated curve in FIG. 16 shows varying of reaction force increment ΔF with different values of risk potential RP. When the risk potential RP is less than a minimum value RPmin, the reaction force increment ΔF is always zero in order to prevent transmission of unnecessary information to the driver. An appropriate value is predetermined as the minimum value RPmin.

Within a region where the risk potential RP exceeds the minimum value RPmin, the reaction force increment ΔF increases exponentially as the risk potential RP increases. The reaction force increment ΔF within this region may be expressed as:

$$\Delta F=k\cdot RP^n \qquad \text{(Eq. 17)}$$

where: k and n are constants that are appropriately determined based on results obtained by drive simulator and field drive to provide smooth conversion of the risk potential RP to the reaction force increment ΔF.

The controller 150 calculates the sum of the reaction force increment ΔF and the ordinary reaction force responsive to the operation amount AS to provide an accelerator pedal reaction force instruction value FA.

At step S405, the controller 150 determines whether or not the estimated result is indicative of a lane-change intention. If this is the case, the program goes to step S406.

At step S406, the controller 150 corrects the accelerator pedal reaction force instruction value FA to give a corrected accelerator pedal reaction force instruction value FAc. In this exemplary implementation, the accelerator pedal reaction force instruction value FA is processed by a low-pass filter and decreased. In this case, the corrected accelerator pedal reaction force instruction value FAc may be expressed as:

$$FAc=gf(FA)=k\cdot\{1/(1+a\cdot Tsf)\}\cdot FA \qquad \text{(Eq. 18)}$$

where: k and a are the appropriately determined constants, and Tsf is the time constant of the low-pass filter.

At the next step S407, the controller 150 determines whether or not detection of lane marker is being lost upon estimating the lane-change intention. If the detection of lane marker is lost and the operations of imaginary drivers have calculated based on the overlapping ratio S between the own vehicle and the preceding vehicle, the program goes to S408 to recorrect the corrected accelerator pedal instruction value FAc.

The recorrected accelerator pedal reaction force FAcc may be expressed as:

$$FAcc=gf2(FAc,S)=k\cdot\{1/(1+Kfdx\cdot a\cdot Tsf)\}\cdot FAc \qquad \text{(Eq. 19)}$$

Figure 17:
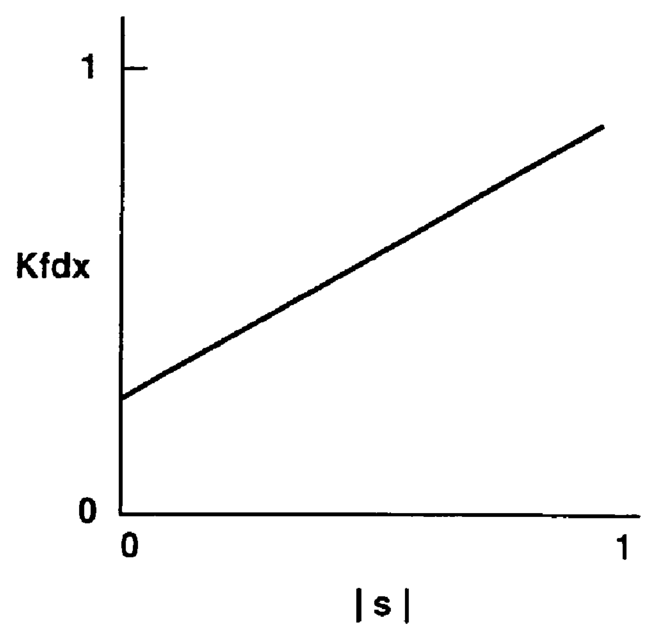
FIG. 17 illustrates changes of a reaction force instruction value recorrection coefficient Kfdx relative to different values of overlapping ratio S.

The coefficient Kfdx applied to the time constant Tsf is set against the overlapping ratio S as illustrated in FIG. 17.

As shown in FIG. 17, the coefficient Kfdx decreases within a range between 0 and 1 (0<Kfdx<1) as the absolute value of the overlapping ratio S decreases. The smaller the absolute value of the overlapping ratio S upon estimating the lane-change intention, the smaller the time constant term (Kfdx·a·Tsf) is. This makes it possible to quickly decrease the accelerator pedal reaction force. If desired, one may directly set the time constant Tsf in response to the overlapping ratio S.

At step S407, if it is determined that lane marker is being detected so that the respective operation of each of imaginary drivers is calculated based on information on the lane marker, the program goes to step S409. At step S409, the controller 150 sets the corrected value FAc as the recorrected value FAcc.

If, at step S405, the estimated intention by the driving intention estimating system 1 is a lane-keeping intention, the program goes to step S410. At step S410, the controller 150 sets the accelerator pedal reaction force instruction value FA as the recorrected value FAcc.

At step S411, the controller 150 provides the recorrected value FAcc calculated at step S408 or S409 or S410, as an output, to the accelerator pedal reaction force unit 170.

Figure 18:
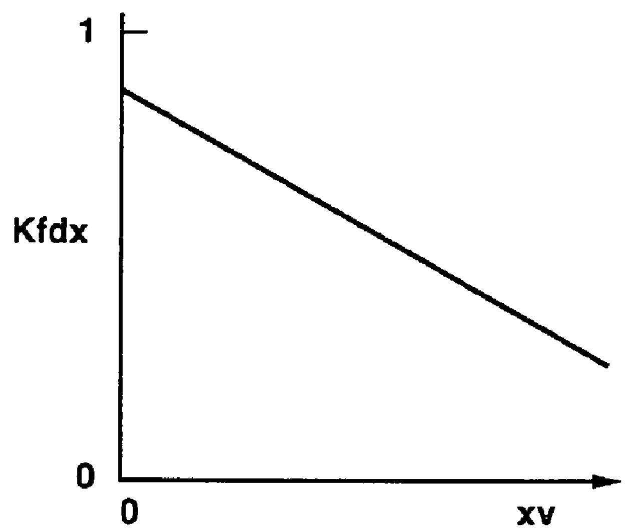
FIG. 18 illustrates values of the recorrection coefficient Kfdx relative to different values of a lateral deviation xv from a center of a rear end of the preceding vehicle.

If the respective operation Oid_2 of each of the imaginary drivers is calculated based on the lateral distance xv when detection of lane marker is being lost, the coefficient Kfdx used in the equation (Eq. 19) is set against the lateral distance xv using the relationship as illustrated in FIG. 18. In this case, the correction coefficient Kfdx varies between 0 and 1 (0<Kfdx<1) such that the Kfdx decreases as the lateral distance xv increases.

Figure 19:
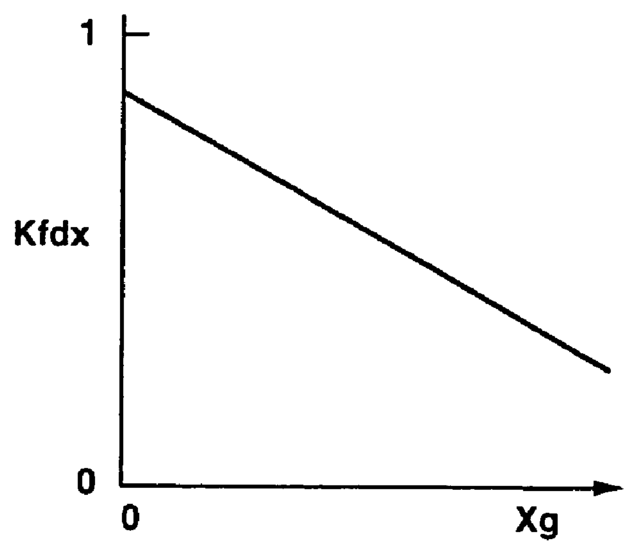
FIG. 19 illustrates values of the recorrection coefficient Kfdx relative to different values of lateral acceleration Xg.

If the respective operation Oid_2 of each of the imaginary drivers is calculated based on the lateral acceleration Xg when detection of lane marker is being lost, the coefficient Kfdx used in the equation (Eq. 19) is set against the lateral acceleration Xg using the relationship as illustrated in FIG. 19. In this case, the correction coefficient Kfdx varies between 0 and 1 (0<Kfdx<1) such that the Kfdx decreases as the lateral acceleration Xg increases.

In addition to the effects provided by the first to third exemplary embodiments, the exemplary embodiment of the driver assisting system 100 provides the effects as follows:

(1) The controller 150 calculates the risk potential RP based on obstacle state within a field around the own vehicle, and carries out regulation of accelerator pedal reaction force based on the calculated risk potential RP. Based on the estimated result provided by the driving intention estimating system 1, the controller 150 corrects the reaction force from the accelerator pedal 160. Accordingly, the controller 150 can regulate the reaction force from the accelerator pedal 160 to meet the driving intention by the driver while keeping transmitting the risk potential RP to the driver by the reaction force via the accelerator pedal 160.

(2) The controller 150 corrects the reaction force from the accelerator pedal 160, that is, the accelerator pedal reaction force instruction value FA, in response to the estimated result of driving intention. Specifically, when the driving intention estimating system 1 estimates lane-change intention, the accelerator pedal reaction force instruction value FA is decreased more than it does when the estimated result is the lane-keeping intention. As the reaction force instruction value FA is decreased when the driver has intention of lane-change, the reaction force from the accelerator pedal 160 will not interfere with the subsequent driver's operation to change for the adjacent lane.

(3) The corrected accelerator pedal reaction force instruction value FAc is recorrected when the respective second operation Oid_2 of each of the imaginary drivers has been calculated and used for estimation of a lane-change driving intention such that the reaction force instruction value FA is smaller than it is when the respective first operation Oid_1 of each of imaginary drivers has been calculated and used for estimation of a lane-change intention. When the estimation is being carried out based on the calculated second operations Oid_2, the threshold T is set at a value greater than the predetermined value T0, causing a delayed timing to estimate a lane-change intention although reducing the frequency of error in estimating the lane-change. To address this problem, the coefficient Kfdx applied to the time constant Tsf is set at a value smaller than 1 as shown in FIG. 17 to accomplish a quick reduction in accelerator pedal reaction force immediately after the estimation of lane-change. Accordingly, both a reduction in error estimation of lane-change and good performance of accelerator pedal reaction force control are accomplished.

Fifth Exemplary Embodiment

Figure 20:
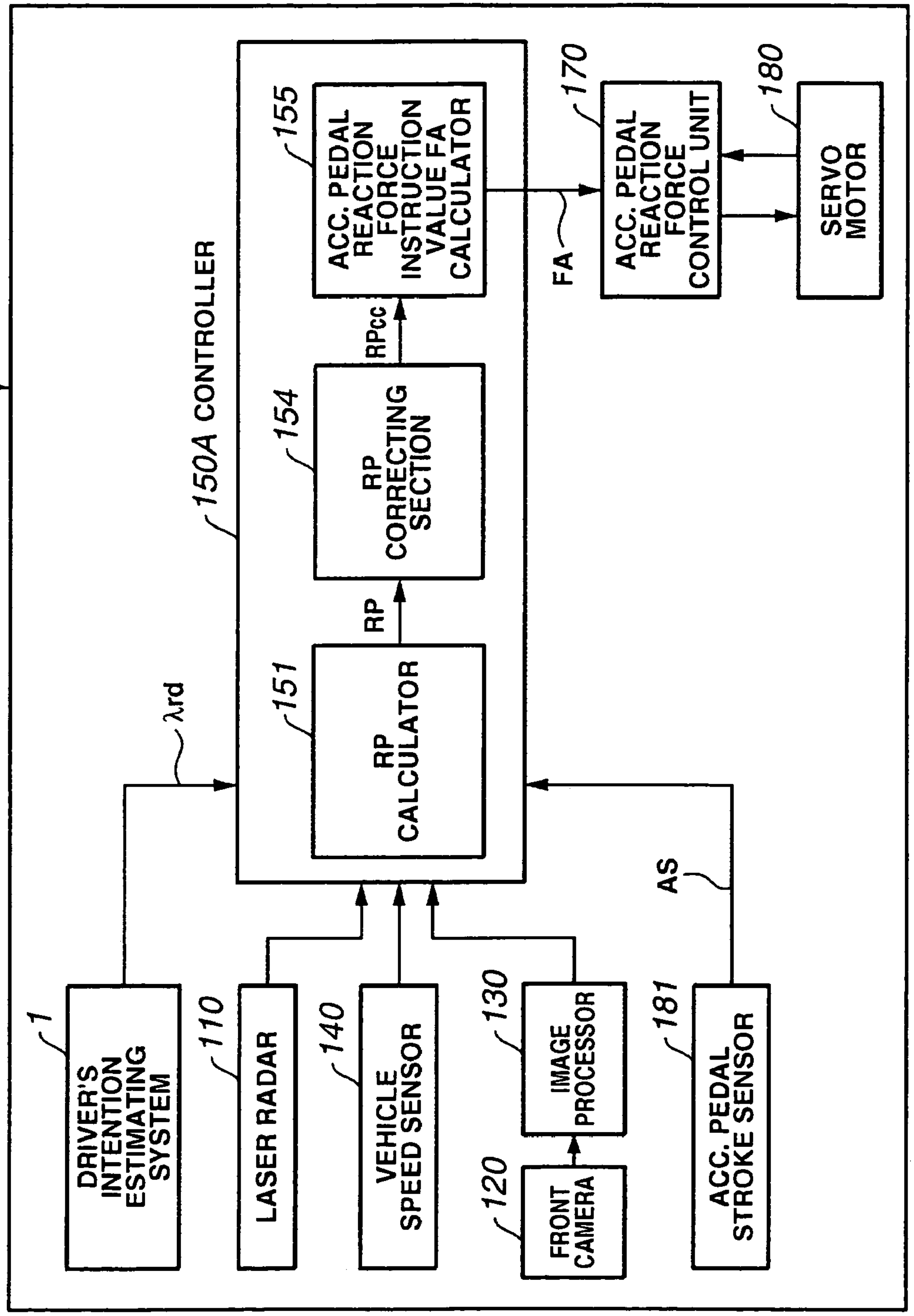
FIG. 20 is a block diagram illustrating a fifth exemplary embodiment of a driver assisting system according to the present disclosure.

Referring to FIG. 20, another exemplary embodiment of a driver assisting system 200 according to the present disclosure is described. The driver assisting system 200 is substantially the same as the driver assisting system 100 shown in FIG. 12. Like reference numerals are used to designate like parts or portions throughout FIGS. 12 and 20. The following description refers only to the differences from the embodiment shown in FIG. 12.

In this exemplary embodiment, the driver assisting system 200 corrects a risk potential RP around an own vehicle upon determination that the driving intention estimating system 1 has estimated a lane-change intention. A controller 150A of the driver assisting system 200 is provided with a software implementation of a risk potential (RP) calculator 151, a risk potential (RP) correcting section 154, and an accelerator pedal reaction force instruction value FA calculator 155.

Figure 21:
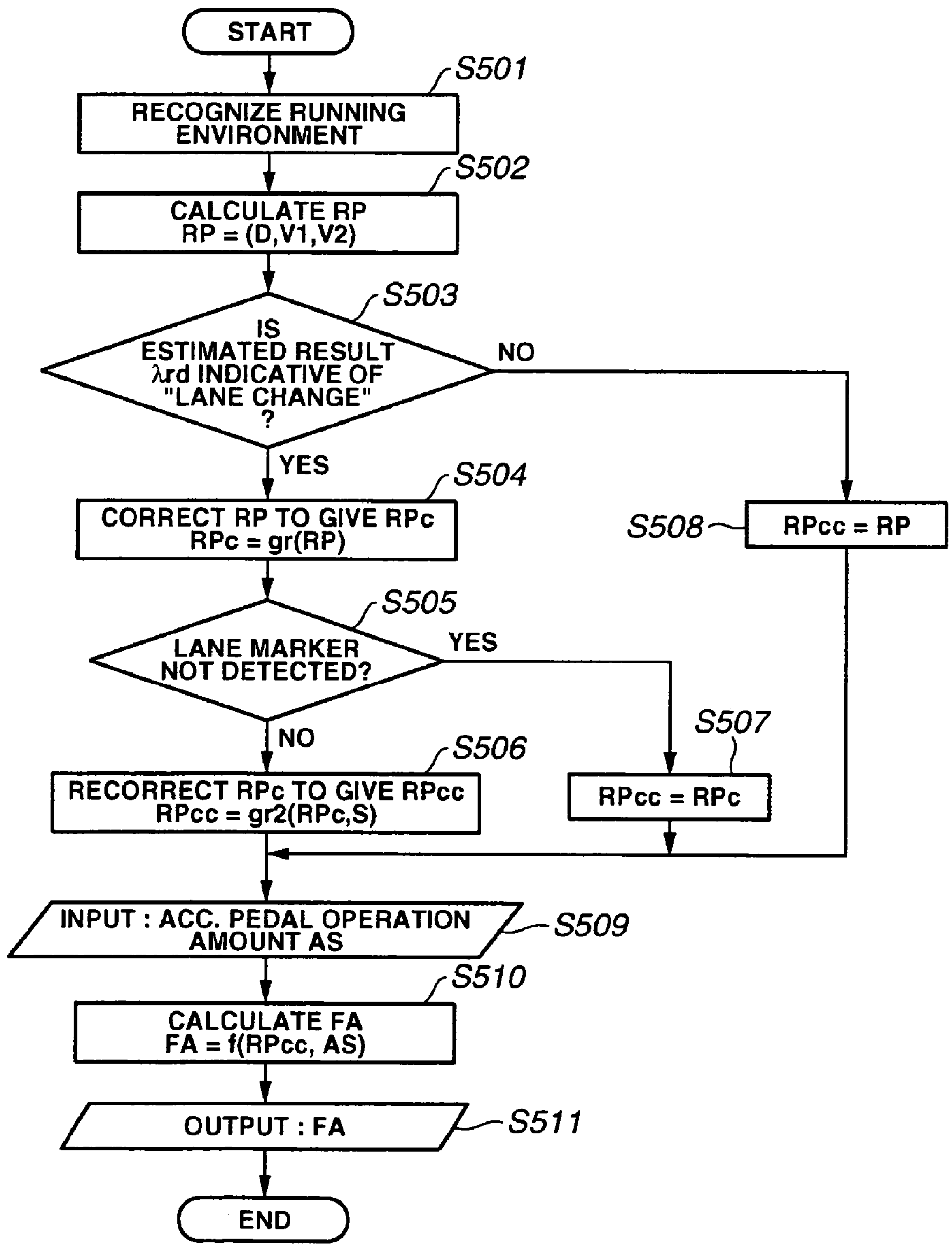
FIG. 21 is a flow chart illustrating the operation of the embodiment illustrated in FIG. 20.

Next, the following description along FIG. 21 provides more understanding of how the driver assisting system 200 works. The flow chart in FIG. 21 illustrates a driver assisting control program stored in the controller 150A. The execution of the program is repeated at a regular interval of, for example, 50 msec. The flow chart illustrated in FIG. 19 has steps S501 and 502, which correspond exactly to the steps S401 and S402 of the flow chart illustrated in FIG. 15. Thus, the controller 150A performs substantially the tasks down to step S502.

At step S503, the controller 150A determines whether or not the estimated driving intention made by the driving intention estimating system 1 is a lane-change intention. If this is the case, the program goes to step S504. At step S504, the controller 150A corrects the risk potential RP to give a corrected risk potential RPc. In this exemplary implementation, the risk potential RP is processed by a low-pass filter and decreased. In this case, the corrected risk potential RPc may be expressed as:

$$RPc=gr(RP)=k\cdot\{1/(1+a\cdot Tsr)\}\cdot RP \qquad \text{(Eq. 20)}$$

where: k and a are the appropriately determined constants, and Tsr is the time constant of the low-pass filter.

At step S505, the controller 150A judges whether or not lane marker was lost upon estimating the lane-change intention. The lane marker was lost and the respective operation Oid_2 of each of the imaginary drivers were calculated based on the relative positional relationship between the own vehicle and the preceding vehicle. If, based on the overlapping ratio S between the own vehicle and the preceding vehicle, the respective second operation Oid_2 of each of the imaginary drivers has been calculated, the program goes to step S506 to recorrect the corrected risk potential RPc.

The recorrected risk potential RPcc may be expressed as:

$$RPcc=gr2(RPc,S)=k\cdot\{1/(1+Krdx\cdot a\cdot Tsr)\}\cdot RPc \qquad \text{(Eq. 21)}$$

Figure 22:
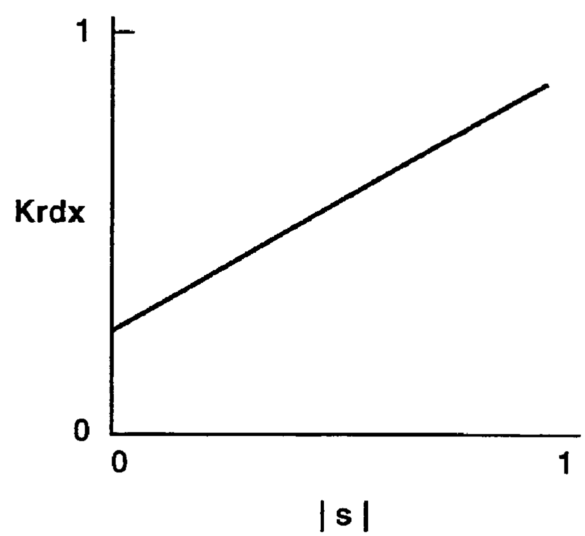
FIG. 22 illustrates values of a risk potential recorrection coefficient Krdx relative to different values of an overlapping ratio S.

The coefficient Krdx applied to the time constant Tsr is set against the overlapping ratio S as illustrated in FIG. 22.

As shown in FIG. 22, the coefficient Krdx decreases within a range between 0 and 1 ($0<Krdx<1$) as the absolute value of the overlapping ratio S decreases. The smaller the absolute value of the overlapping ratio S upon estimating the lane-change intention, the smaller the time constant term ($Krdx\cdot a\cdot Tsr$) is. This makes it possible to quickly decrease the risk potential RP. If desired, one may directly set the time constant Tsr in response to the overlapping ratio S.

At step S505, if it is determined that lane marker is being detected so that the respective operation of each of imaginary drivers is calculated based on information on the lane marker, the program goes to step S507. At step S507, the controller 150A sets the corrected value RPc as the recorrected value RPcc.

If, at step S503, the estimated intention by the driving intention estimating system 1 is a lane-keeping intention, the program goes to step S508. At step S508, the controller 150A sets the risk potential RP as the recorrected value RPcc.

At step S509, the controller 150A reads in accelerator pedal operation amount AS detected at the accelerator pedal stroke sensor 181. At step S510, the controller 150A calculates an accelerator pedal reaction force instruction value FA based on the recorrected value RPcc obtained at step S506 or S507 or S508. The manner of converting the recorrected value RPcc to the accelerator pedal reaction force instruction value FA corresponds exactly to the previously described manner of converting the risk potential RP to the accelerator pedal reaction force instruction value FA (see step S404 in FIG. 15 and the associated description).

At step S511, the controller 150A provides the accelerator pedal reaction force instruction value FA calculated at step S510, as an output, to the accelerator pedal reaction force unit 170.

Figure 23:
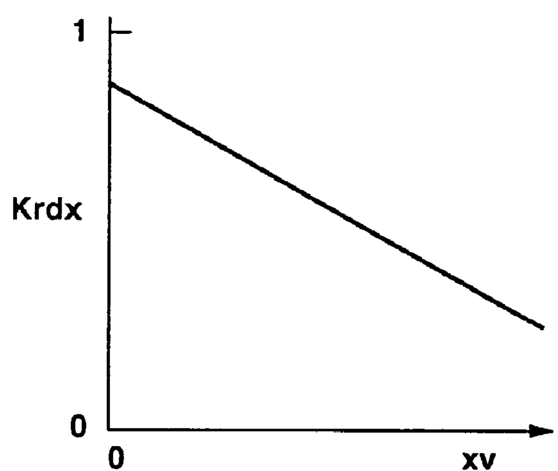
FIG. 23 illustrates values of the risk potential recorrection coefficient Krdx relative to different values of a lateral deviation xv from the preceding vehicle.

If the respective operation Oid_2 of each of the imaginary drivers is calculated based on the lateral distance xv when detection of lane marker is being lost, the coefficient Krdx used in the equation (Eq. 21) is set against the lateral distance xv using the relationship as illustrated in FIG. 23. In this case, the correction coefficient Krdx varies between 0 and 1 ($0<Krdx<1$) such that Krdx decreases as the lateral distance xv increases.

Figure 24:
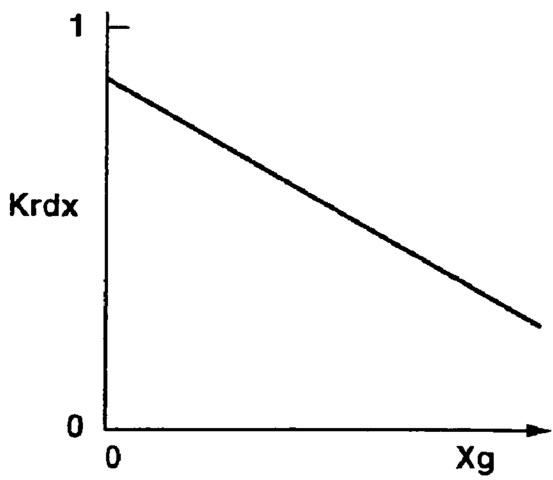
FIG. 24 illustrates values of the risk potential recorrection coefficient Krdx relative to different values of a lateral acceleration Xg.

If the respective operation Oid_2 of each of the imaginary drivers is calculated based on the lateral acceleration Xg when detection of lane marker is being lost, the coefficient Krdx used in the equation (Eq. 21) is set against the lateral acceleration Xg using the relationship as illustrated in FIG. 24. In this case, the correction coefficient Krdx varies between 0 and 1 ($0<Krdx<1$) such that the Krdx decreases as the lateral acceleration Xg increases.

In addition to the effects provided by the fifth exemplary embodiment shown primarily in FIG. 12, this exemplary embodiment provides effects as follows:

(1) The controller 150A corrects the risk potential RP based on the estimated result provided by the driving intention estimating system 1. Particularly, when the estimated result provided by the driving intention estimating system 1 is a lane-change intention, the risk potential RP decreases more that it does when the estimated result is not the lane-change intention. This decreasing the risk potential RP causes reduction in accelerator pedal reaction force instruction value FA, preventing the reaction force from the accelerator pedal 160 from interfering with the driver's operation to change for the adjacent lane.

(2) The controller 150A recorrects the risk potential RP such that, when the estimation by the driving intention estimating system 1 has been carried out based on the respective second operation Oid_2 of each of the imaginary drivers, the risk potential is lower that it is when the estimation by the driving intention estimating system has been carried out based on the respective first operation Oid_1 of each of the imaginary drivers. When the estimation is being carried out based on the calculated second operations Oid_2, the threshold T is set at a value greater than the predetermined value T0, causing a delayed timing to estimate a lane-change intention although reducing the frequency of error in estimating the lane-change. To cope with this problem, the coefficient Krdx applied to the time constant Tsr is set at a value smaller than 1 as shown in FIG. 22 to accomplish a quick reduction the risk potential causing a quick reduction in accelerator pedal reaction force immediately after the estimation of lane-change. Accordingly, both a reduction in error estimation of lane-change and good performance of accelerator pedal reaction force control are accomplished.

In the before described first to third embodiments, a likelihood-series value Pids has been calculated from the present operation of each of the imaginary drivers and operation of the real driver back to the past operations thereof, and the change-lane intention score Sc as expressed by the equation (Eq. 12) is calculated based on the respective likelihood-series values Pids. The disclosure is not limited to this example. The driving intention may be estimated after calculating the lane-change intention score Sc based on likelihood values Pid of the respective present operation of each of the imaginary drivers with respect to the present operation of the real driver.

Instead of calculating the lane-change intention score Sc, a score of lane-change likelihood may be calculated from a lane-change likelihood Pr(LC) and a lane-keeping likelihood Pr(LK).

In the fourth and fifth exemplary embodiments, the risk potential has been calculated using the time to contact TTC and time threshold THW between the own vehicle and the preceding vehicle. The present disclosure is not limited to this example. For example, the reciprocal of the time to contact TTC may be used as risk potential RP. The relationship between the risk potential RP and the reaction force increment $\Delta F$ is not limited to the illustrated relationship in FIG. 16. Various increasing patterns of reaction force increment $\Delta F$ as risk potential RP increases may be used in map implementations.

In the fourth exemplary implementation, the reaction force increment $\Delta F$ that is determined in response to the risk potential RP is added to the ordinary reaction force characteristic to give an accelerator pedal reaction force value FA, and this reaction force instruction value FA is corrected and recorrected. The present disclosure is not limited to this example. For example, the reaction force increment $\Delta F$ may be corrected and recorrected before adding to the ordinary reaction force characteristic to give the recorrected value FAcc.

In the first to fifth exemplary embodiments, the vehicle's surrounding detector 10 is operative to perform the function of vehicle's surrounding detecting means. The real driver's operation detector 30 is operative to perform the function of driver's operation detecting means. The first imaginary driver's operation calculator 40 is operative to perform the function of second imaginary driver's operation calculating means. The second imaginary driver's operation calculator 50 is operative to perform the function of second imaginary driver's operation calculating means. The selector 60 is operative to perform the function of imaginary driver's operation selecting means. The likelihood calculator 70 is operative to perform the function of driving operation likelihood values calculating means. The driver's driving intention estimator 80 is operative to perform the function of driving intention estimating means. Moreover, the selector 60 is operative to perform also the function of the criterion altering implementation. The vehicle status detector 20 is operative to perform the function of own vehicle movement detecting means. Furthermore, the laser radar 110, the front camera 120 and the vehicle speed sensor 140 constitute the obstacle detecting means. The risk potential 151 is operative to perform the function of risk potential calculating means. The accelerator pedal reaction force instruction value calculators 152 and 155 perform the function of reaction force calculating means. The accelerator pedal reaction force control unit 170 is operative to perform the function of reaction force generating means. The accelerator pedal reaction force instruction value correction section 153 and the risk potential correcting section 154 are operative to perform the function of correcting means. The obstacle detecting means may take the form of radar of the other type, such as, millimeter radar. The reaction force generating means may take the form of a steering reaction force control unit for generation of steering reaction force.

Although the disclosure has been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A system for estimating a driving intention, comprising:

a detector configured to obtain a first type of environmental information and a second type of environmental information relating to a driving environment associated with an own vehicle, wherein the first type of environmental information is different from the second type of environmental information;

an operation detector configured to detect an operation of a real driver of the own vehicle;

a first imaginary driver's operation calculator configured to calculate a respective imaginary operation of each of a plurality of imaginary drivers of a first type based on the first type of environmental information, wherein the respective imaginary operation of each of the imaginary drivers of the first type is needed to accomplish a respective imaginary driving intention assigned to each of the imaginary drivers of the first type;

a second imaginary driver's operation calculator, in a parallel configuration with the first imaginary driver's operation calculator, configured to calculate a respective imaginary operation of each of a plurality of imaginary drivers of a second type based on the second type of environmental information, wherein the respective imaginary operation of each of the imaginary drivers of the second type is needed to accomplish a respective imaginary driving intention assigned to each of the imaginary drivers of the second type;

a selector configured to select information related to the imaginary drivers of the first type or the imaginary drivers of the second type; and a driving intention estimator configured to estimate a driving intention of the real driver based on the detected operation of the real driver and the respective imaginary operation of each of the imaginary drivers of the selected type.

2. The system of claim 1, wherein:

the driving intention estimator estimates the driving intention of the real driver based on a predetermined criterion using a threshold, and the threshold corresponding to the selected imaginary drivers being the second type is set to be higher relative to the threshold corresponding to the selected imaginary drivers being the first type.

3. The system of claim 2, wherein:

the second imaginary driver's operation calculator calculates the respective operation of each of the imaginary drivers of the second type based on an overlapping ratio of a lap between the own vehicle and a preceding vehicle, relative to a width of the preceding vehicle, and responsive to the imaginary drivers of the second type being selected, the threshold is decreased responding to a decreased overlapping ratio.

4. The system of claim 1, wherein the second imaginary driver's operation calculator calculates the respective operation of each of the imaginary drivers of the second type based on a relative lateral positional relationship of the own vehicle to a preceding vehicle.

5. The system of claim 4, wherein the relative lateral positional relationship is an overlapping ratio representing a lap between the own vehicle and the preceding vehicle, relative to a width of the preceding vehicle.

6. The system of claim 5 further comprising a detector configured to detect lateral acceleration of the own vehicle;

wherein the driver's driving intention estimator stops estimating the driving intention of the real driver responsive to the lateral acceleration being no greater than a predetermined acceleration value and a time rate of the overlapping ratio being no less than a predetermined rate value.

7. The system of claim 4, wherein the relative lateral positional relationship is a lateral distance between a middle point between lateral ends of a front end of the own vehicle and a middle point between lateral ends of a rear end of the preceding vehicle.

8. The system of claim 1 further comprising a detector configured to detect a behavior of the own vehicle;

wherein the second imaginary driver's operation calculator calculates the respective operation of each of the imaginary drivers of the second type based on the detected behavior immediately after a selection by the selector changes from the imaginary drivers of the first type to the imaginary drivers of the second type.

9. The system of claim 8, wherein the detected behavior of the own vehicle is lateral acceleration.

10. The system of claim 8, wherein:

the second imaginary driver's operation calculator calculates the respective operation of each of the imaginary drivers of the second type based on a relative lateral positional relationship of the own vehicle to a preceding vehicle; and the relative lateral positional relationship is an overlapping ratio representing a lap between the own vehicle and the preceding vehicle, relative to a width of the preceding vehicle.

11. A system for estimating a driving intention, comprising:

detection means for obtaining a first type of environmental information and a second type of environmental information relating to a driving environment associated with an own vehicle, wherein the first type of environmental information is different from the second type of environmental information;

operation detection means for detecting an operation of a real driver of the own vehicle;

first means for calculating a respective imaginary operation of each of a plurality of imaginary drivers of a first type based on the first type of environmental information, wherein the respective imaginary operation of each of the imaginary drivers of the first type is needed to accomplish a respective imaginary driving intention assigned to each of the imaginary drivers of the first type;

second calculation means for calculating, in a parallel configuration with the first means for calculating, a respective imaginary operation of each of a plurality of imaginary drivers of a second type based on the second type of environmental information, wherein the respective imaginary operation of each of the imaginary drivers of the second type is needed to accomplish a respective imaginary driving intention assigned to each of the imaginary drivers of the second type;

selection means for selecting information related to the imaginary drivers of the first type or the imaginary drivers of the second type; and intention estimation means for estimating a driving intention of the real driver based on the detected operation of the real driver and the respective imaginary operation of each of the plurality of imaginary drivers of the selected type.

12. A method for estimating a driving intention, comprising:

obtaining a first type of environmental information and a second type of environmental information relating to a driving environment associated with an own vehicle, wherein the first type of environmental information is different from the second type of environmental information;

detecting an operation of a real driver of the own vehicle;

calculating a respective imaginary operation of each of a plurality of imaginary drivers of a first type based on the first type of environmental information, wherein the respective imaginary operation of each of the imaginary drivers of the first type is needed to accomplish a respective imaginary driving intention assigned to each of the imaginary drivers of the first type;

calculating, in parallel with the calculating the respective imaginary operation of each of the plurality of imaginary drivers of the first type, a respective imaginary operation of each of a plurality of imaginary drivers of a second type based on the second type of environmental information, wherein the respective imaginary operation of each of the imaginary drivers of the second type is needed to accomplish a respective imaginary driving intention assigned to each of the imaginary drivers of the second type;

selecting information related to the imaginary drivers of the first type or the imaginary drivers of the second type; and estimating a driving intention of the real driver based on the detected operation of the real driver and the respective imaginary operation of each of the plurality of imaginary drivers of the selected type.

13. A system for estimating a driving intention, comprising:

a detector configured to obtain a first type of environmental information and a second type of environmental information relating to a driving environment associated with an own vehicle, wherein the first type of environmental information is different from the second type of environmental information;

an operation detector configured to detect an operation of a real driver of the own vehicle;

a first imaginary driver's operation calculator configured to calculate a first respective imaginary operation of each of a plurality of imaginary drivers of a first type based on the first type of environmental information, wherein the first respective imaginary operation of each of the imaginary drivers of the first type is needed to accomplish a respective imaginary driving intention assigned to each of the imaginary drivers of the first type;

a second imaginary driver's operation calculator, in a parallel configuration with the first imaginary driver's operation calculator, configured to calculate a second respective imaginary operation of each of a plurality of imaginary drivers of a second type based on the second type of environmental information, wherein the second respective imaginary operation of each of the imaginary drivers of the second type is needed to accomplish a respective imaginary driving intention assigned to each of the imaginary drivers of the second type;

a selector configured to select the first respective imaginary operations or the second respective imaginary operations;

a likelihood calculator configured to calculate a respective likelihood value of each of the selected ones of the first and second respective imaginary operations with respect to the detected operation of the real driver of the own vehicle; and a driving intention estimator configured to estimate a driving intention of the real driver based on the calculated respective likelihood values.

14. The system of claim 13, wherein the first type of environmental information is a relative lateral positional relationship of the own vehicle with respect to lane markers.

15. The system of claim 13, wherein the second type of environmental information is a relative lateral positional relationship of the own vehicle with respect to a preceding vehicle.

16. A method for estimating a driving intention of a real driver of an own vehicle, comprising:

detecting lane markers of a lane;

obtaining a positional relationship of the own vehicle relative to the lane markers when detecting the lane markers is possible;

obtaining a positional relationship of the own vehicle relative to a preceding vehicle when detecting the lane markers is not possible;

detecting an operation of the real driver of the own vehicle;

calculating a first respective imaginary operation of each of a plurality of imaginary drivers of a first type based on the positional relationship of the own vehicle relative to the lane markers, wherein the first respective imaginary operation of each of the imaginary drivers of the first type is needed to accomplish a respective imaginary driving intention assigned to each of the imaginary drivers of the first type;

calculating, in parallel with the calculating the first respective imaginary operation of each of the plurality of imaginary drivers of the first type, a second respective imaginary operation of each of a plurality of imaginary drivers of a second type based on the positional relationship of the own vehicle relative to the preceding vehicle, wherein the second respective imaginary operation of each of the imaginary drivers of the second type is needed to accomplish a respective imaginary driving intention assigned to each of the imaginary drivers of the second type;

selecting the first respective imaginary operations when detecting the lane markers is possible or the second respective imaginary operations when detecting the lane markers is not possible;

calculating a respective likelihood value of each of the selected ones of the first and second respective imaginary operations with respect to the detected operation of the real driver of the own vehicle; and estimating a driving intention of the real driver based on the calculated respective likelihood values.

* * * * *

UNITED STATES PATENT AND TRADEMARK OFFICE

CERTIFICATE OF CORRECTION

PATENT NO. : 7,809,506 B2
APPLICATION NO. : 11/285778
DATED : October 5, 2010
INVENTOR(S) : Nobuyuki Kuge et al.

It is certified that error appears in the above-identified patent and that said Letters Patent is hereby corrected as shown below:

IN THE TITLE:

Replace “ESTIMATION”, with -- ESTIMATING --

IN THE CLAIMS:

In Column 30, Line 4: Replace “claim 13”, with -- claim 14 --.

Signed and Sealed this
Twenty-ninth Day of November, 2011

David J. Kappos
*Director of the United States Patent and Trademark Office*

UNITED STATES PATENT AND TRADEMARK OFFICE

CERTIFICATE OF CORRECTION

PATENT NO. : 7,809,506 B2
APPLICATION NO. : 11/285778
DATED : October 5, 2010
INVENTOR(S) : Nobuyuki Kuge et al.

It is certified that error appears in the above-identified patent and that said Letters Patent is hereby corrected as shown below:

Title Page, Item (54) and at Column 1, line 1,

IN THE TITLE:

Replace “ESTIMATION”, with -- ESTIMATING --.

IN THE CLAIMS:

In Column 30, Line 4: Replace “claim 13”, with -- claim 14 --.

This certificate supersedes the Certificate of Correction issued November 29, 2011.

Signed and Sealed this
Third Day of January, 2012

David J. Kappos
*Director of the United States Patent and Trademark Office*